(12) United States Patent
Wickett et al.

(10) Patent No.: US 8,545,330 B2
(45) Date of Patent: Oct. 1, 2013

(54) CONTEXTUAL IN-GAME MESSAGING SYSTEM

(75) Inventors: Justin Wickett, San Francisco, CA (US); Shane Ishmael Sareli, San Francisco, CA (US); Michael Kane, San Francisco, CA (US); Justin Potter Driemeyer, San Francisco, CA (US); Lamberto Alvaro, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/244,915

(22) Filed: Sep. 26, 2011

(65) Prior Publication Data

US 2013/0029766 A1  Jan. 31, 2013

Related U.S. Application Data

(60) Provisional application No. 61/512,804, filed on Jul. 28, 2011.

(51) Int. Cl.
*A63F 9/24* (2006.01)

(52) U.S. Cl.
USPC .......................................................... 463/42

(58) Field of Classification Search
USPC .......................................................... 463/42
See application file for complete search history.

(56) References Cited

U.S. PATENT DOCUMENTS

| | | | | |
|---|---|---|---|---|
| 5,880,731 A | * | 3/1999 | Liles et al. | 715/758 |
| 6,346,952 B1 | * | 2/2002 | Shtivelman | 715/758 |
| 8,088,010 B1 | * | 1/2012 | Hill | 463/42 |
| 2004/0224772 A1 | | 11/2004 | Canessa et al. | |
| 2006/0282538 A1 | * | 12/2006 | Anglin et al. | 709/228 |

OTHER PUBLICATIONS

Mirriam Webster's Collegiate Dictionary, 10th Edition, 1997, definition of Game.*

"U.S. Appl. No. 13/485,919, Non Final Office Action mailed Jul. 17, 2013", 11 pgs.

* cited by examiner

*Primary Examiner* — Corbett B Coburn

(74) *Attorney, Agent, or Firm* — Schwegan, Lundberg & Woessner, P.A.

(57) ABSTRACT

A method of enabling in-game contextual chatting is disclosed. A request for information about an online game currently being played by a first player and a second player is received. A previous online game that was previously played by the first player and the second player is determined. A chat transcript is generated that pertains to the online game in response to the request for the information, the chat transcript spanning from the online game currently being played by the first player and the second player to the previous online game that was previously played by the first player and the second player.

17 Claims, 30 Drawing Sheets

Animation sequence (simultaneous):
1. Turn/River revealed
2. Player's chips animate to table
3. Player's tournament chip stack updates
4. Dealer chat posted Animation sequence:
1. Dealer chat is updated
2. Player A's blind animates in
3. Player A's hole cards animate in
4. Betting buttons revealed Animation sequence:
1. Reveal Turn and River
2. Reveal Player B's cards
3. Show "[player wins]" bubble
4. Chips animate, score updates
5. Bar animates
6. Elements fade Clicking Skip takes player to next hand in the game requiring action on their behalf

CONTEXTUAL IN-GAME MESSAGING SYSTEM

CROSS-REFERENCE TO RELATED APPLICATIONS

This application claims the benefit under 35 U.S.C. §119 of U.S. Provisional Application No. 61/512,804. filed Jul. 28, 2011, entitled "COMBINING GAMES BASED ON LEVELS OF INTER ACTIVITY OF THE GAMES," which is incorporated herein by reference in its entirety.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, and so forth. In some games, a goal of the game may be to acquire certain in-game assets, which can then be used to complete in-game tasks or to overcome certain in-game obstacles. For example, a player may be able to acquire a virtual key (i.e., the in game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

In many computer games, there are various types of in-game actions that a player character can make within the game. For example, a player character in an online role-playing game may be able to interact with other player characters, build a virtual house, attack enemies, go on a quest, go to a virtual store to buy/sell virtual items, and the like. A player character in an online poker game may be able to play at specific tables, place bets of virtual currency for certain amounts, play or fold certain hands, play in a online poker tournament, and so forth.

BRIEF DESCRIPTION OF THE DRAWINGS

Some embodiments are illustrated by way of example and not limitation in the figures of the accompanying drawings in which:

FIG. 5 is a flowchart illustrating an example method of revealing a partial result of an action performed by a first player before the final result of the action is known;

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

In various embodiments, methods and systems of enabling in-game contextual chatting are disclosed. A request for information about an online game currently being played by a first player and a second player is received. A previous online game that was previously played by the first player and the second player is determined. A chat transcript is generated that pertains to the online game in response to the request for the information, the chat transcript spanning from the online game currently being played by the first player and the second player to the (previous online game that was previously played by the first player and the second player.

In various embodiments, the chat transcript may include a header that provides a context of messages included in the chat transcript after the header. For example, the header may include information pertaining to a stage of the game during which messages following the header were entered. For a card game, such information may include a hand number of the card game. For a game in which a blind is posted, the information may include an amount of the blind. Furthermore, the chat transcript may be configured to include messages entered automatically on behalf of the player to reflect actions of the player and messages entered manually by the player.

Figure 1:
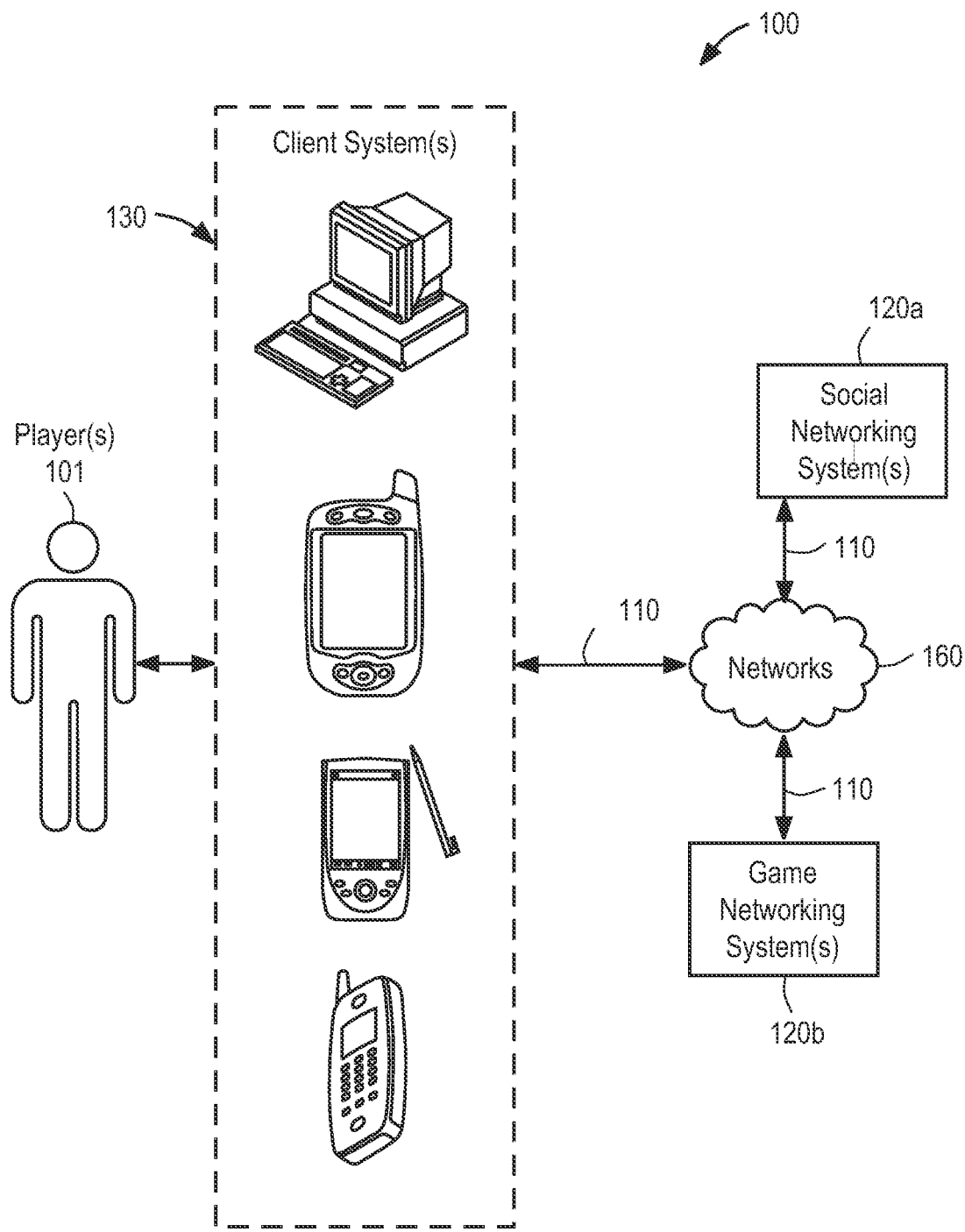
FIG. 1 is a block diagram illustrating an example of a system for implementing various disclosed embodiments.

FIG. 1 is a block diagram illustrating an example of a system 100 for implementing various disclosed embodiments. In particular embodiments, system 100 comprises player 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, extranet, a virtual private network (VPN), a local area network (LAN), a wireless LAN (WLAN), a wide area network (WAN), a wireless WAN (WWAN), metropolitan area network (MAN), a portion of the Internet, a portion of the Public Switched Telephone Network (PSTN), a cellular telephone network, another type of network, or a combination of two or more such networks.

Social networking system 120a is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120a or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, and the like. networking systems 120a, game networking systems 120b, client systems 130, and networks 160, this disclosure contemplates any suitable number of players 101, social networking systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include one or more of an ad hoc network, an intranet, an extranet, VPN, a LAN, a WLAN, a WAN, a WWAN, a MAN, a portion of the Internet, a portion of the PSTN, a cellular telephone network, or another type of connection, or a combination of two or more such connections, Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a. or game networking system 120b, thereby bypassing network 160.

Online Games and Game Systems
Game Networking Systems

In an online, computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including NPCs and in-game objects, The game engine also manages game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, game state, etc.). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to Hypertext Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and. may be responsible for maintaining application data. of the game, processing the inputs from the player, updating and/or synchronizing the game state based on the game logic and each input from the player, and transmitting, instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.

Game Systems, Social Networks, and Social Graphs

In an online multiplayer game, players may control player characters (PCs) and a game engine controls non-player characters (NPCs) and game features. The game engine also manages player character state and game state and tracks the state for currently active (i.e., online) players and currently inactive offline) players. A player character can have a set of attributes and a set of friends associated with the player character, As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a watt or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, u first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users. character to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player, Where the player and the user are connected through N edges (or N-1 other users), they are deemed to be separated by N degrees of separation, This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 120a or game networking system 120b). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
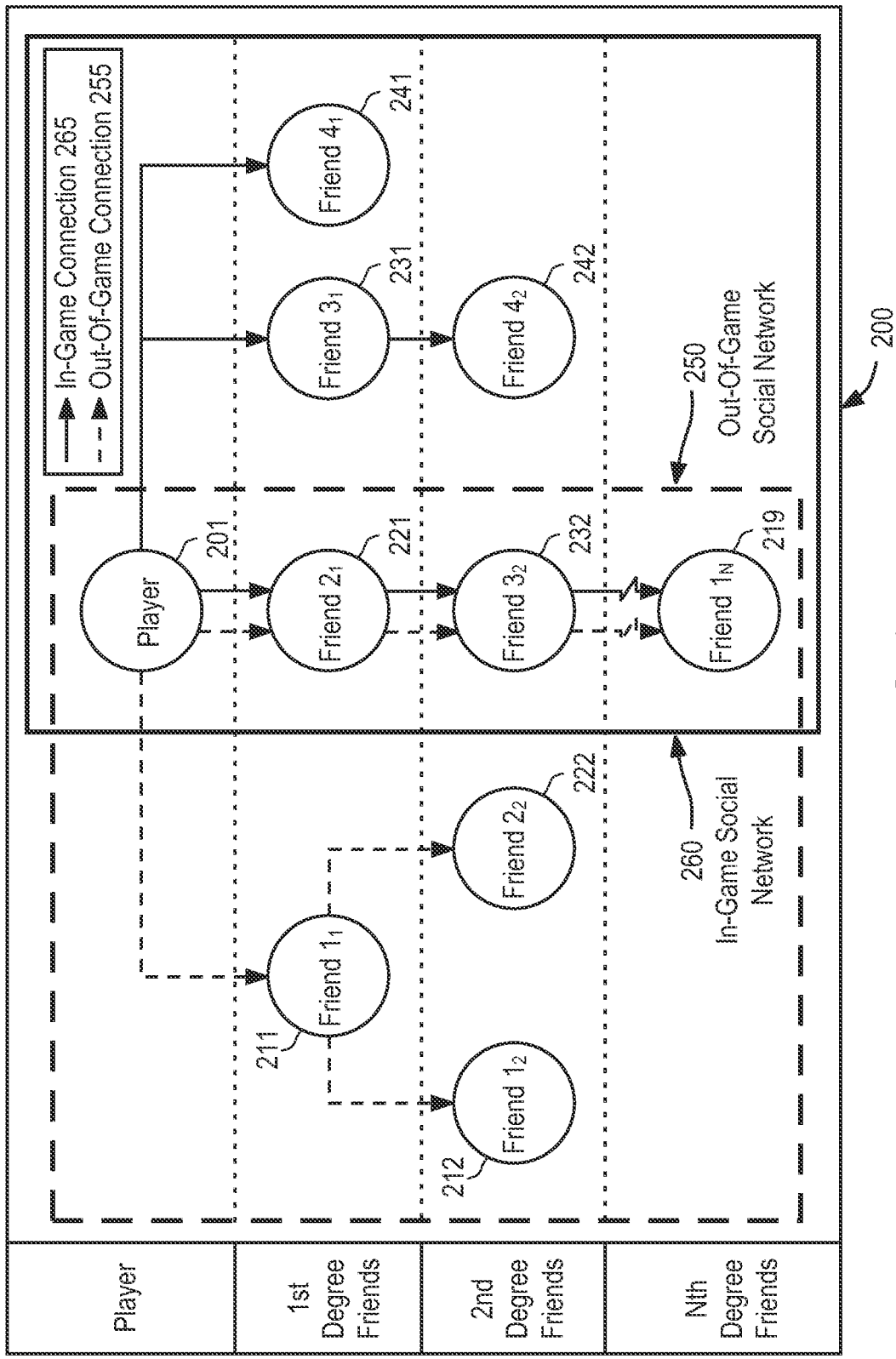
FIG. 2 is a block diagram illustrating an example of a social network within a social graph.

FIG. 2 is a block diagram illustrating an example of a social network 200 within a social graph. As shown, Player 201 can be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration and not by way of limitation, the details of out-of-game social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to whom he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG, 2. For example, Nth-degree Friend $1_N$ 219 is connected to Player 201 via second-degree Friend $3_2$ 232 and one or more other higher-degree friends. Various embodiments may utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260, and friend $4_2$ 242 is a second-degree friend with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out-of-game social networks. In sonic embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access an in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other).

Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Game Systems

A game event may be an outcome of an engagement, a provision of access, rights and/or benefits, or the obtaining of some assets (e.g., health, money, strength, inventory, land, etc.). A game engine determines the outcome of a game event according to a variety of factors, such as the game rules, a player character's in-game actions, player character state, game state, interactions of other player characters, and random calculations. Engagements can include simple tasks (e.g., plant a crop, clean a stove), complex tasks (e.g., build a farm or business, run a cafe), or other events.

An online game can be hosted by a game networking system 2820b, which can be accessed over any suitable network with an appropriate client system 2830. A player may have a game system account on game networking system 2820b, wherein the game system account can contain a variety of information about the player (e.g., the player's personal information, player character state, game state, etc.). In various embodiments, an online game can be embedded into a third-party website. The game can be hosted by the networking system of the third-party website, or it can be hosted on game networking system 2820b and merely accessed via the third-party website. The embedded online game can be hosted solely on a server of game networking system 2820b or using a third-party vendor server. In addition, any combination of the functions of the present disclosure can be hosted on or provided from any number of distributed network resources. For example, one or more executable code objects that implement all or a portion of the game can be downloaded to a client system for execution.

Virtual Currency

In various embodiments, players within the game can acquire virtual currency. such games, the virtual currency might be represented by virtual coins, virtual cash, or by a number or value stored b r the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. In some embodiments, a player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

In some embodiments, virtual currency can be used to purchase one or more in-game assets or other benefits. For example, a player may be able to exchange virtual currency for a desired level, access, right, or item in an online game. In one embodiment, legal currency can be used to directly purchase an in-game asset or other benefit. The player can select the desired in-game asset or other benefit. Once appropriate selections are made, the player can place the order to purchase the in-game asset or other benefit. This order is received by the game networking system 2820b, which can then process the order. If the order is processed successfully, an appropriate financial account associated with the player can be debited by the amount of virtual currency or legal currency needed to buy the selected in-game asset or other benefit.

In some embodiments, multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. In some implementations, virtual cash may also be awarded for leveling up in the game.

Game Interactivity

Games may have various levels of interactivity. The level of interactivity of a game may be based on various factors, such as how many actions a player typically performs over a particular time period while playing the game or a portion of the game, Depending on the number of actions that the player performs and the length of the particular time period, a player may have a certain amount or percentage of idle or downtime while playing a game or downtime may be time during the game in which a player is passively engaged in the game (e.g., watching other players perform actions in the game) or otherwise not actively performing actions with respect to the game.

For example, while playing a multiplayer "live" online card game, a player may have downtime from the moment he folds the cards he is dealt at the beginning of a hand until the moment he is dealt new cards at the beginning of a new hand. For example, in a Texas Hold'Em game, after folding his cards, a player may be idle (or merely passively engaged) in a hand until other players who are still actively involved in the hand play the hand to completion and new cards for a new hand have been dealt to the player.

Games may have various types of levels of interactivity. For example, a game may have a level of social interactivity that relates to the number of actions a player typically performs over a particular time period that involve a social interaction. Examples of actions that may pertain to the level of social interactivity of the game may include placing abet or raising abet in a Texas Hold'Em game (which is an action by the player that is directed toward other players that requires a response by the other players) or calling a bet or raising a bet in Texas Hold'Em game (which is an action by the player in response to an action by another player that is directed to the player and other players). Additional examples of actions that may pertain to the level of social interactivity of the game may include sending or receiving of messages pertaining to the game. For example, a game that involves posting messages pertaining to the game on the social networking system 120a on a Facebook profile of a player of the game) may have a higher level of social interactivity than a game that merely sends private messages between players based on, for example, a number of people who may be exposed to the messages pertaining to the game.

As another example, a game may have a level of game interactivity that relates to the number of actions a player typically performs over a particular time period in order to play the game. Examples of actions that may pertain to the level of game interactivity of the game may include actions relating to providing an input to the game (e.g., via an input device, such as a mouse or keyboard).

The various types of levels of interactivity may be independent of one another. For example, a game may have a high level of game interactivity and a low level of social interactivity or vice versa.

Additionally, a level of interactivity of a game may depend on the time period over which the actions pertaining to the level of interactivity of the game are performed. For example, a Texas Hold'Em game that gives a player 30 seconds to perform each action pertaining to the game may have a higher level of interactivity than a Texas Hold'Em game that gives the player three days to perform each action.

Depending on a level of interactivity of a game, a player of the game may have idle or downtime during portions of the game. During this idle time the player may choose to do other things, such as check email, send a text message, browse the web, or even step away from a client device that the player is using to play the game. However, if presented with an opportunity or an incentive to play an additional or supplemental game, the player may choose to play the additional game instead of doing other things.

Keeping the player active as active as possible on the game networking system 120b may not only keep the player more entertained while they are playing the game (or the supplemental game) on the game networking system, but also increase the activity levels of the players with respect to the game networking system 120b. This increase in the activity levels of the players may, in turn, lead, at least indirectly, to an increase of revenues of an entity that operates the game networking system 120b. For example, the entity operating the game networking system 120b may be able to collect more money from advertisers on the game networking system 120b based on the activity levels of the users of the game networking system 120b being higher.

Figure 3:
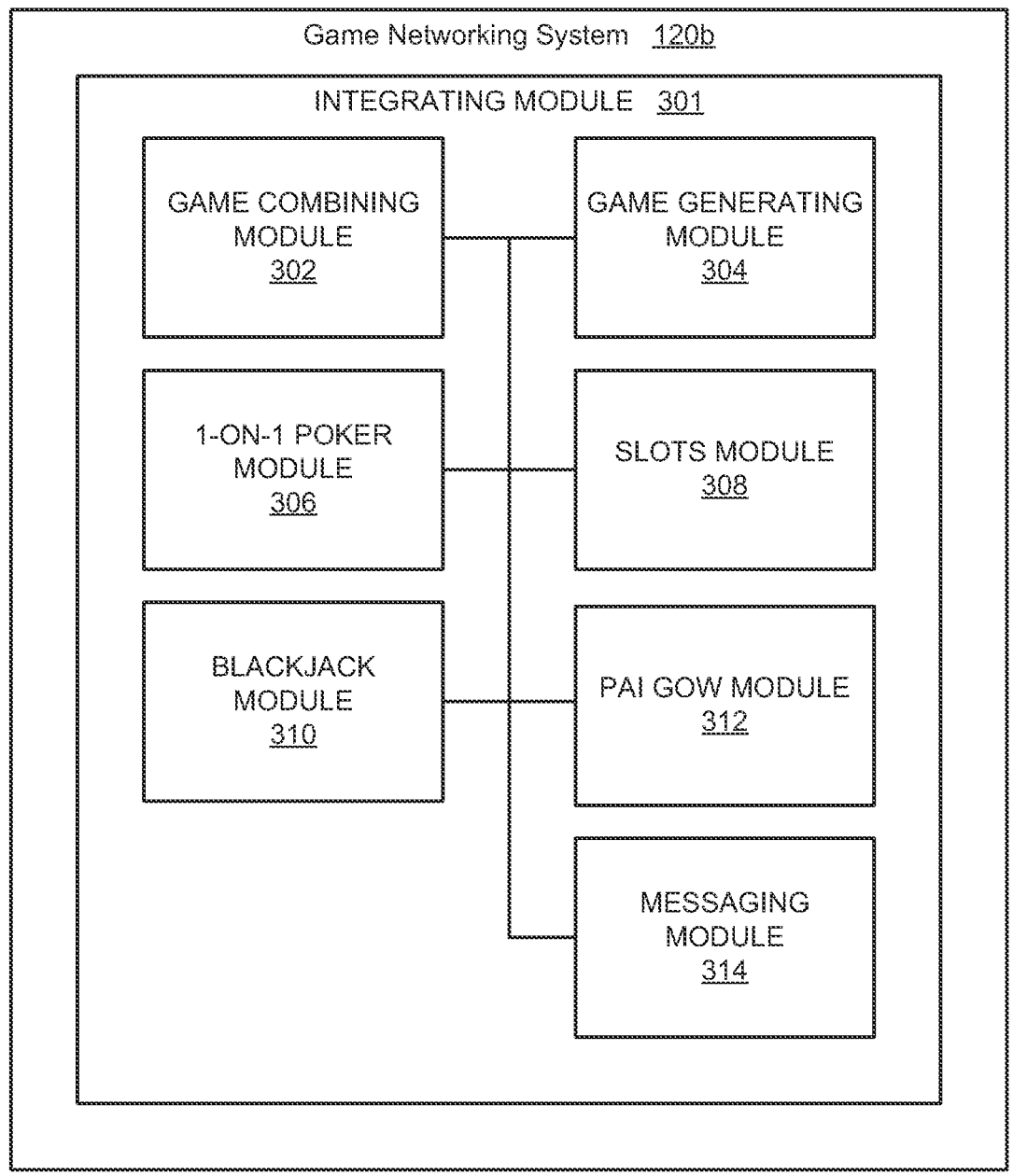
FIG. 3 is a block diagram illustrating example modules of a game networking system.

FIG. 3 is a block diagram illustrating example modules of the game networking system 120b. The game networking system 120b includes an integrating module 302 configured to integrate games into the game networking system 120b. The integrating module 302 may include a game combining module 302 configured to select or combine games based on their levels of interactivity, a game generating module 304 configured to generate or configure games based on desired levels of interactivity), a 1-On-1 Poker module 306 to enable players to play a modified form of a Texas Hold'Em game, a slots module 308 configured to enable players to play a slots tournament (e.g., as a secondary game), a blackjack module 310 configured to enable players to play a blackjack challenge game (e.g., as a secondary game), a Pai Gow module 312 configured to enable players to play a Pai Gow game (e.g., as a secondary game), and a messaging module 314 configured to enable players to participate in a chat or messaging thread that spans multiple rounds or sessions of a game.

Game Combining Module

The game combining module 302 may detect that a player has idle time within a primary game. In response to this detection of idle time, the game combining module 302 may present an opportunity or an incentive (e.g., points or chips in the primary game or virtual currency) for the player to play a secondary (or supplemental or side) game. The game combining module 302 may select the secondary game based on a level of interactivity of the secondary game relative to the primary game. For example, if the primary game is a "live" multiplayer online card game, such as Texas Hold'Em, the game combining module 302 may select the secondary game based on the secondary game having a lower level of interactivity, such that the player can play the secondary game when he is idle in the primary game (e.g., in the time period between when the player folds his cards in a hand of the Texas Hold'Em game and receives his next cards in a next hand of the Texas Hold'Em game).

Additionally, the game combining module 302 may select the secondary game based on a relationship (e.g., a thematic relationship) between the primary game and the secondary game. For example, if the primary game is a card game, the game combining module 302 may select the secondary game (e.g., Pai Gow Poker) based on the secondary game also being a card game (e.g., Texas Hold'Em). Or, if the primary game is a casino game, the game combining module 302 may select the secondary game (e.g., a Blackjack tournament) based on the secondary game being a casino game a slots tournament).

The game combining module 302 may select the secondary game based on information about the user (e.g., information collected by the game networking system pertaining to actions of the player within the game networking system or information extracted by the game networking system from a profile of the player maintained by the player on a social networking site). For example, the game combining module 302 may select a secondary game that is a card game based on information that the game networking system extracted from the player's Facebook profile pertaining to the interests (or "likes") of the player.

In various embodiments, the game combining module 302 may present the player of the primary game with an opportunity to play a secondary game via a user interface that is integrated with the user interface for the primary game. in this way, the game combining module 302 may make the opportunity to play the secondary game more attractive to or convenient for the player of the primary game. For example, upon detecting that the player has folded his cards in a live multiplayer Texas Hold'Em game, the game combining module 302 may launch a lobby for a different game (e.g., the poker game described below) that is integrated into the user interface of the Texas Hold can game.

The integration of the user interface of the secondary game into the user interface of the primary game may include adding an icon to a navigation area of the user interface for the primary game that enables the user to launch the lobby for the secondary game. Additionally, the integration of the user interface of the secondary game into the user interface of the primary game may include automatically closing or inactivating the lobby for the secondary game when idle time for the player ends with respect to the primary game (e.g., when it is the player's turn to act in a card game).

In various other embodiments, the user interface of the secondary game may be presented independently of the primary game.

The secondary game may be a modified form of a game in which the level of interactivity of the modified form of the game has been reduced in comparison to a standard form of the game. For example, the secondary game may be a modified form of a game generated by a game generating module 304 (described below). The standard form of the game may be the standard form of the game as described in books on rules or strategy, such as books written by Edmond Hoyle.

Game Generating Module

The game generating module 304 may generate or configure modified forms of games for playing as primary or secondary games via the game networking system 120b. For example, the game generating module 304 may generate a modified form of a card game that has a level of interactivity that is compatible with a level of interactivity of a primary game, such that the level of interactivity of the modified form of the card game is compatible with the level of interactivity of the primary game. In various embodiments, the game generating module 304 may determine an appropriate level of interactivity of the secondary game based on a fit between time periods during which a player typically has idle time while playing the primary game and time periods during which a player typically has idle time while playing the secondary game. For example, the game generating module 304 may determine that an appropriate level of interactivity of the secondary game includes ensuring that the player can remain idle with respect to the secondary game white being active with respect to the primary game or vice versa.

To generate a modified form of a game, the game generating module 304 may start with a standard form of a game and change various aspects of the standard form of the game to create a modified game that has a higher or lower level of interactivity in comparison to the standard form of the game. For example, the game generating module 304 may create a modified form of a game that includes fewer rounds than a standard form of the game. Or the game generating module 304 may create a modified form of a game in which various actions are automatically performed on behalf of a player of the game under certain circumstances. Or the game generating module 304 may create a modified form of a game that includes few players (e.g., a heads up or 1-on-1 style game instead of a multi-player game of three or more players). Or the game generating module 304 may create a modified form of a game that includes a longer time period for a player to perform an action (e.g., three days instead of 30 seconds).

In this way, the game generating module 304 may create a modified form of a game that can be played relatively asynchronously (e.g., when one or more players of the game are offline) in comparison to the standard form of the game. One skilled in the art would understand that the game generating module 304 may create a modified form of a game that includes any combination of changes to a standard form of the game, such as the changes described above (e.g., to create a modified form of the game that has a level of interactivity that makes the modified form of the game compatible with a primary game for playing as a secondary game of the primary game). The messaging module 314 may enable a player to communicate (e.g., chat) with his opponents between rounds or sessions of games of the same type (e.g., between rematches of a 1-On-1 Poker game). For example, the messaging module 314 may present a chat user interface in one of the screens of a game, as described below and depicted with respect to FIGS. 12A-12C, 15C, 16A-16B, 17A, 18A-18C, and 19A-19B. In the chat user interface, the messaging module 314 may present a chat transcript to a player of the game that includes messages automatically entered on behalf of the players that correspond to actions each player performed within a game. The chat transcript may also include messages manually entered by the players during the course of the game. Messages automatically entered may have a different formatting than messages manually entered (e.g., different types of messages may be presented in different text colors). The chat transcript may be separated based on rounds of the game that have been completed or based on games that have been completed. Additionally, the chat transcript may be filtered to include only chats between the players that pertain to a particular type of game. As an example, a chat transcript for the 1-On-1 Poker game described below may include chat messages entered by the players (or on behalf of the players) that correspond to the 1-On-1 Poker game that the players are currently playing as well as 1-On-1 Poker games that the players have played in the past, but not chat messages pertaining to other games that the players are currently playing or have played in the past.

In addition to asynchronous chat messaging, the messaging module 314 may be configured to handle other forms of communications between players, including short-message-service (SMS) messaging, real-time (instant) messaging, email messaging pop-up (or push) notification messaging, and so on.

Figure 4:
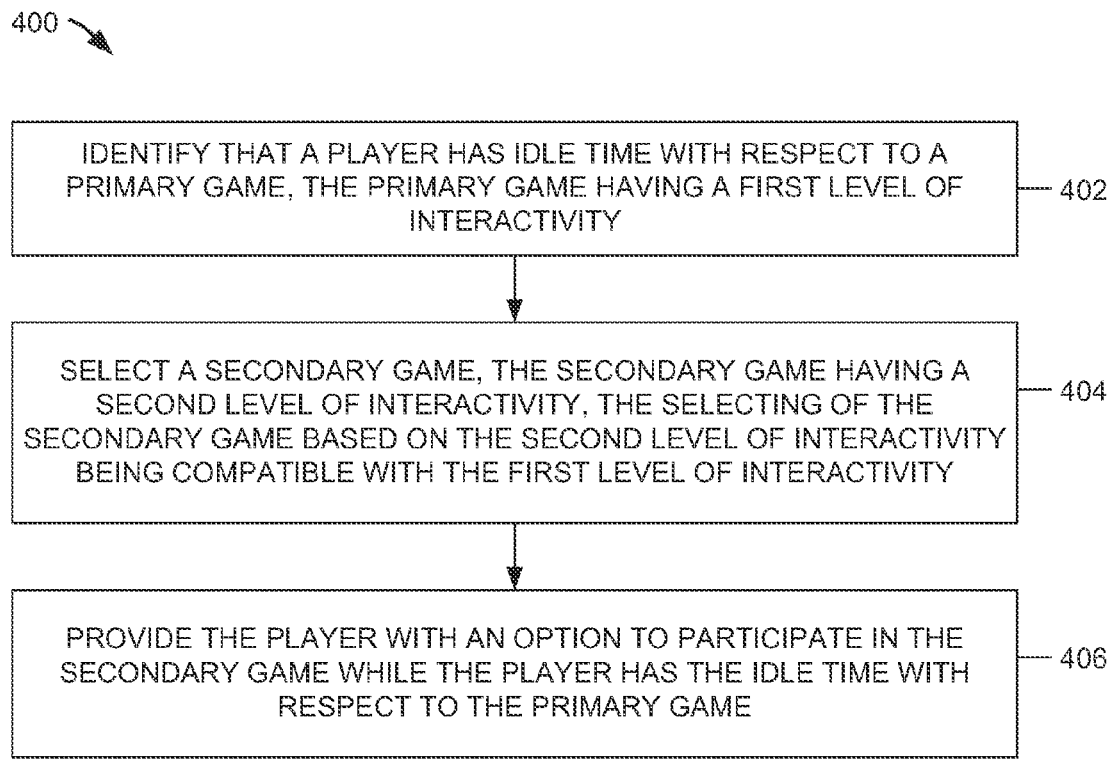
FIG. 4 is a flowchart illustrating an example method of combining a primary game with a secondary game based on a level of interactivity of the primary game and a level of interactivity of the secondary game.

FIG. 4 is a flowchart illustrating an example method 400 of combining a primary game with a secondary game based on a level of interactivity of the primary game and a level of interactivity of the secondary game. At operation 402, the game combining module 302 identifies that a player has idle time with respect to a primary game. The primary game has a first level of interactivity. For example, if the primary game is a live online multiplayer poker game a Texas Hold'Em tournament or ring game being played by multiple users within a Zynga Poker, PokerStars, PartyPoker, or Full Tilt Poker client), the primary game may have a high level of interactivity relative to other games. Nevertheless, the player may have idle time during the game, such as during the time period after the player folds his cards and before the player receives new cards from the dealer. The game combining module 302 may calculate the player's average amount of idle time based on a monitoring of the player's past actions with respect to the primary game. The game combining module 302 may use the player's average amount of idle time to estimate the player's expected amount of idle time.

At operation 404, the game combining module 302 selects a secondary game based on a level of interactivity of the secondary game being compatible with the level of interactivity of the primary game. For example, the game combining module 302 may select the secondary game based on the secondary game having a level of interactivity that enables the player of the primary game to play the secondary game white he has a calculated expected amount of idle time with respect to the primary game. The secondary game selected by the game combining module 302 may be generated or configured by the game generating module 304 such that the secondary game has a level of interactivity that is compatible with the level of interactivity of the primary game, For example, the game combining module 302 may generate, configure, or select a secondary game having a portion (e.g., around) that the player may complete within the average amount of idle time that the player has with respect to a primary game.

At operation 406, the game combining module 302 provides the player with an option to participate in the secondary game while the player has idle time with respect to the primary game. For example, if it is not the player's turn to act in the primary game, or if the player is idle for another reason with respect to the primary game, the game combining module 302 may present a user interface for the secondary game in a side-pane of the primary game). The game combining module 302 may temporarily inactivate a user interface of the primary game and temporarily activate a user interface of the secondary game (e.g., until the player's idle time ends with respect to the primary game).

Figure 5:
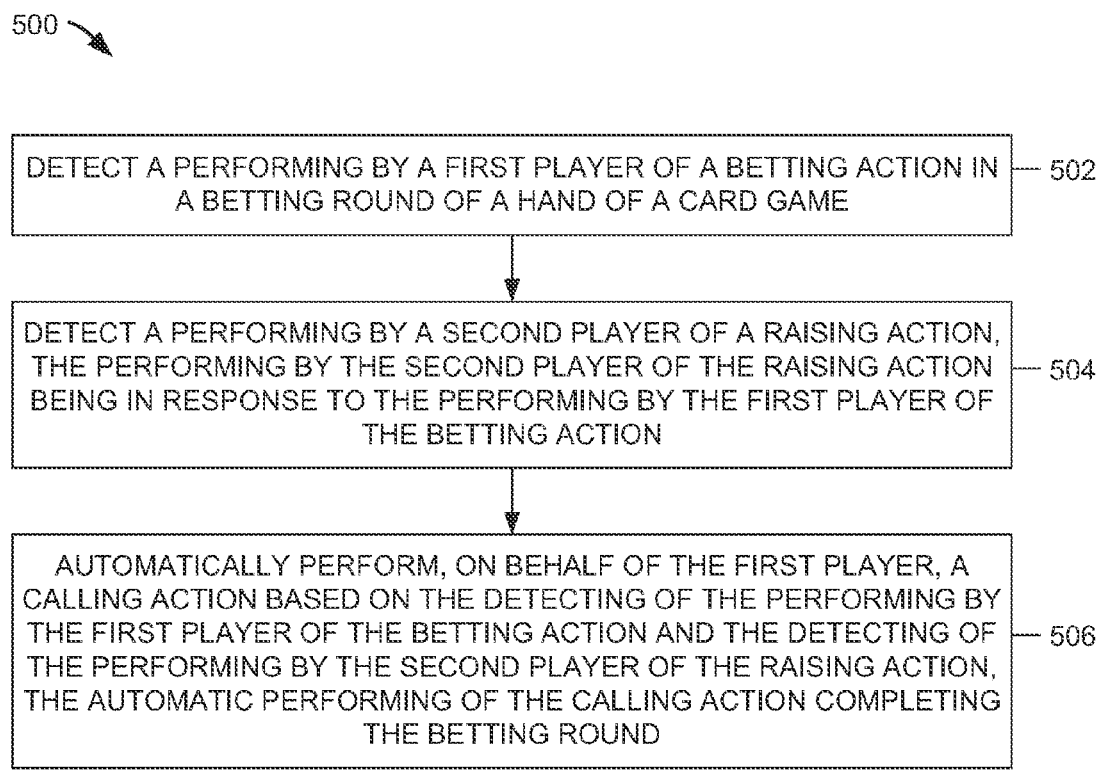
FIG. 5 is a flowchart illustrating an example method of automatically performing a calling action on behalf of a first player in response to a raising action by a second player in order to automatically complete a round of game without requiring the first player to perform an additional betting action.

FIG. 5 is a flowchart illustrating an example method 500 of automatically performing a calling action on behalf of a first player in response to a raising action by a second player in order to automatically complete a round of game without requiring the first player to perform an additional betting action. At operation 502, the 1-On-1 Poker module 306 detects a performing by a first player of a betting action in a betting round of a hand of a card game. For example, the 1-On-1 Poker module 306 detects that a player has raised the blind of an opponent.

At operation 504, the 1-On-1 Poker module 306 detects a performing by a second player of a raising action in response to the performing by the first player of the betting action. For example, the 1-On-1 Poker module 306 detects that the player's opponent has re-raised the player's raise of the blind of the player's opponent.

At operation 506, the 1-On-1 Poker module 306 automatically performs, on behalf of the first player, a calling action based on the detecting of the performing by the first player of the betting action and the detecting of the performing by the second player of the raising action. Here, the automatic performing of the calling action completes the betting round. Thus, the 1-On-1 Poker module enables a round of betting to be completed based on a performing of one betting action by each of a first player and a second player, eliminating the back-and-forth action that would normally be required in a betting round in which each player re-raises a bet by his opponent.

Figure 6:
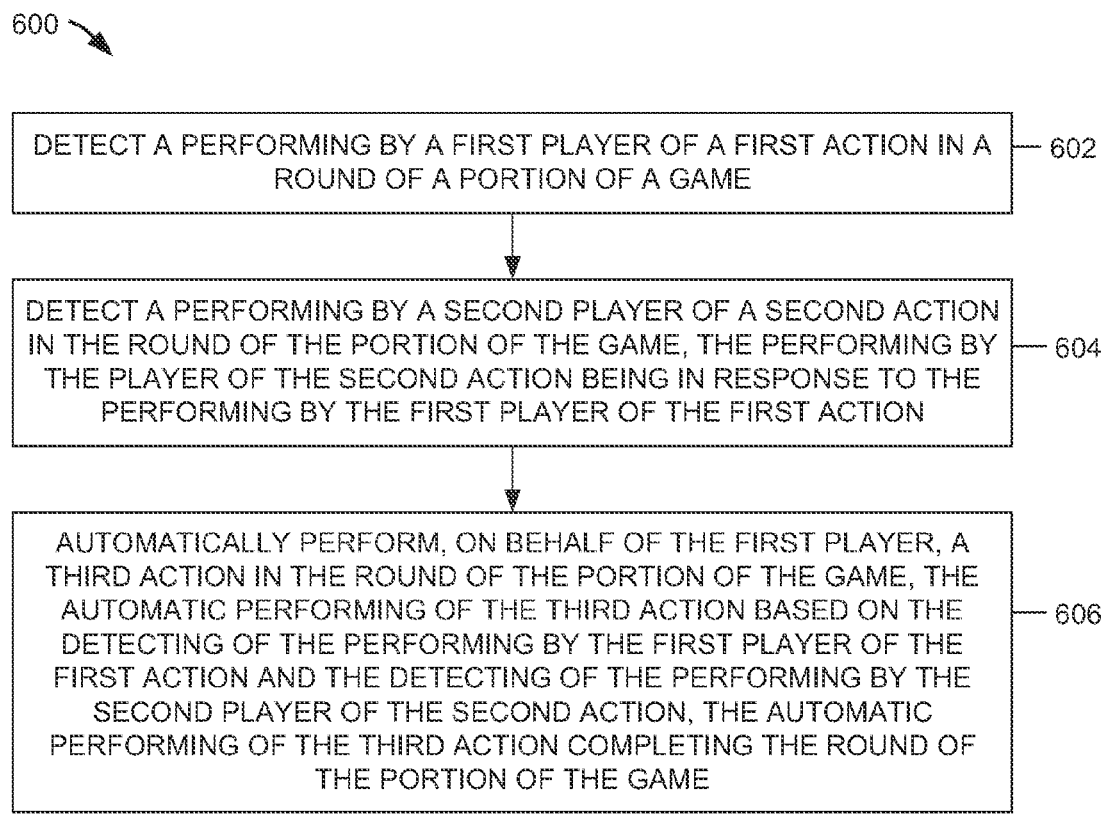
FIG. 6 is a flowchart illustrating an example method of automatically performing an action on behalf of a first player in response to an action by a second player in order to automatically complete a round of game.

FIG. 6 is a flowchart illustrating an example method 600 of automatically performing an action on behalf of a first player in response to an action by a second player in order to automatically complete a round of game. At operation 602, the game networking system 120b detects a performing by a first player of a first action in a round of a portion of a game. For example, the game networking system 120b detects a performing of a betting action by a first player in a round of a hand of a Texas Hold'Em game.

At operation 604, the game networking system 120b detects a performing by a second player of a second action in the round of the portion of the game, the performing by the player of the second action being in response to the performing by the first player of the first action. For example, the game networking system 120b detects that the second player has raised a bet by the first player in a betting round of a hand of a Texas Hold'Em game.

At operation 606, the game networking system 120b automatically performs, on behalf of the first player, a third action in the round of the portion of the game, the automatic performing of the third action being based on the detecting of the performing by the first player of the first action and the detecting of the performing by the second player of the second action. Here, the automatic performing of the third action completes the rounds of the portion of the game. For example, the game networking system 120b automatically performs a calling action on behalf of the first player in response to a raising action by the second player in a betting round of a hand of a Texas Hold'Em game. in this way, the round of the game is completed based on a single action being performed by each of the first player and the second player, a default action being automatically selected and performed on behalf of one of the players such that the round is completed without requiring the one of the players to select and perform one of multiple actions.

Figure 7:
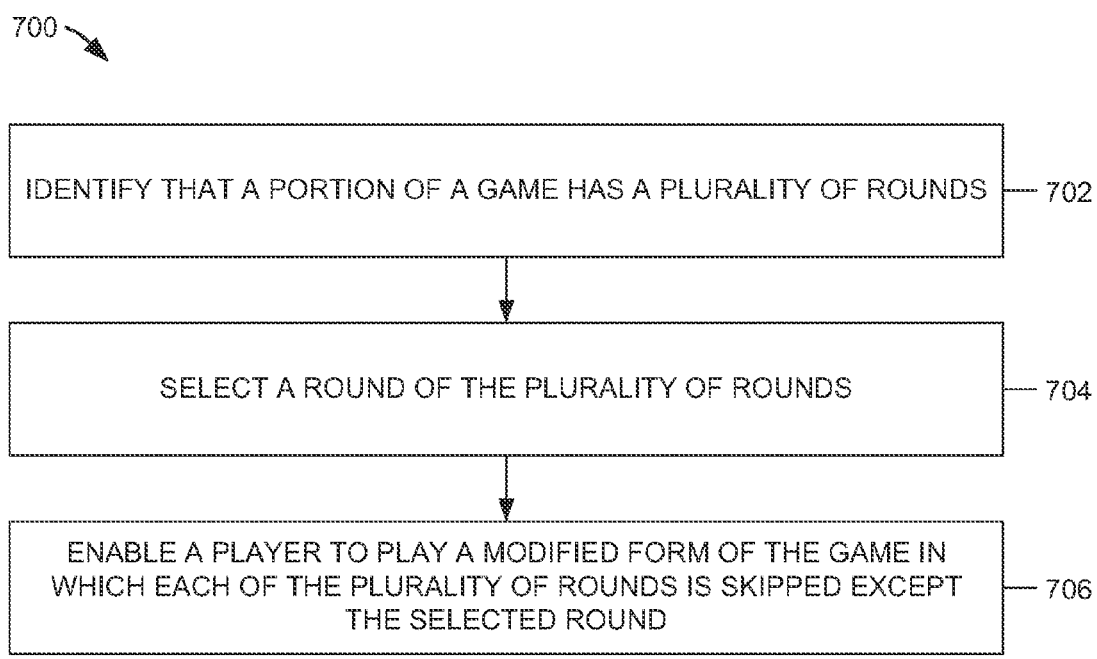
FIG. 7 is a flowchart illustrating an example method of enabling a player to play a modified form of a game in which all but one of a plurality of rounds of the game are skipped.

FIG. 7 is a flowchart illustrating an example method 700 of enabling a player to play a modified form of a game in which all but one of a plurality of rounds of the game are skipped. At operation 702, the game generating module 304 identifies that a portion of a game has a plurality of rounds. For example, the game generating module 304 identifies that a Texas Hold'Em game has multiple betting rounds after the hole cards are dealt, after the flop is dealt, after a turn is dealt, and after a river is dealt).

At operation 704, the game generating module 306 selects a round of the plurality of betting rounds. For example, for the Texas Hold'Em game, the game generating module 306 may select the betting round that occurs after the flop is dealt. The game generating module 306 may select the round based on various factors. For example, the game generating module 306 may select the round based on a comparison of historical data pertaining to the levels of activity of the players with respect to a game networking system when different rounds were selected. Thus, for the Texas Hold'Em game, the game generating module 306 may select the betting round after the flop based on the players having been more active with respect to the game networking system when that betting round was selected in the past.

At operation 706, the game generating module 306 enables a player to play a modified form of the game in which each of the plurality of rounds is skipped except the selected round. For example, the game generating module 306 may generate a modified form of a Texas Hold'Em game that has a single betting round that occurs after the flop is dealt. The other betting rounds (e.g., after the hole cards are dealt, after the turn card is dealt, and after the river card is dealt) are skipped. The game networking system 120b may integrate the modified form of the game into the game networking system 120b as a primary or a secondary game. For example, the game combining module 302 may select the modified form of the game to use as a secondary game for combining with a primary game.

In various other embodiments, the game generating module 306 may generate a modified form of the game in which one or more betting rounds, but not all betting rounds, are skipped. Furthermore, in various other embodiments, the game generating module 306 may generate a modified form of the game in which one or more betting rounds are added or used to replace standard betting rounds. For example, the game generating module 306 may create a modified Texas Hold'Em game that includes a non-standard betting round that occurs before any cards are dealt, after a single card has been dealt to one of a plurality of players or each of a plurality of players, or after a particular number of cards has been dealt, In various embodiments, the game generating module 306 may generate or configure a modified form of the game based on input from a system administrator of the game networking system 120b.

Figure 8:
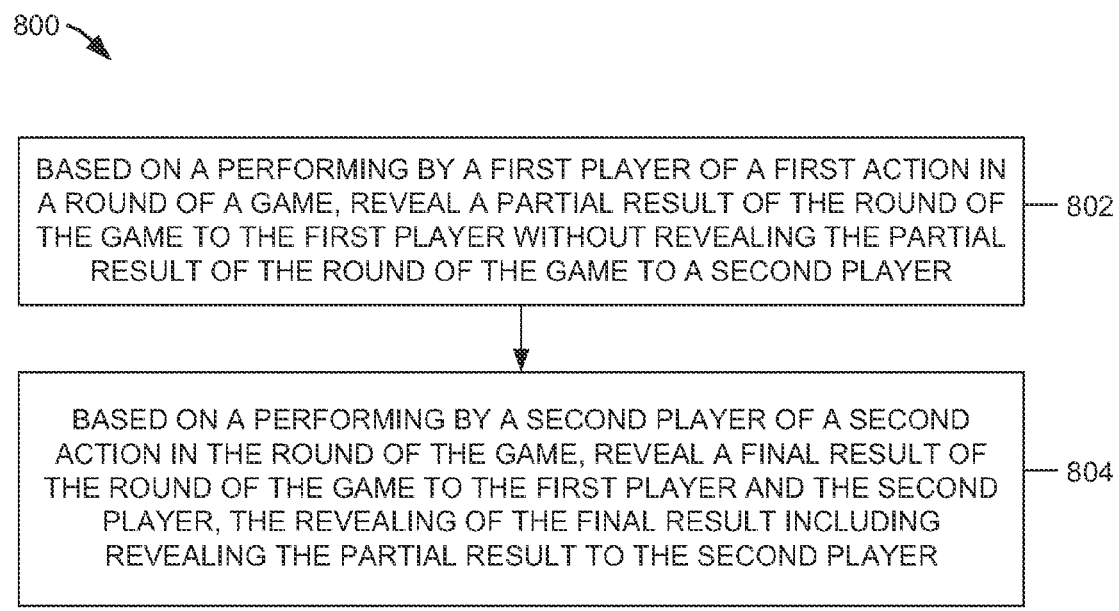

FIG. 8 is a flowchart illustrating an example method 800 of revealing a partial result of an action performed by a first player before the final result of the action is known. At operation 802, based on a performing by a first player of a first action in a round of a game, the game networking system 120b reveals a partial result of the round of the game to the first player without revealing the partial result of the round of the game to the second player. For example, after a first player performs abetting action in a modified form of a Texas Hold'Em game that includes a single betting action in a single betting round by each player, such as in a round of betting after the flop is dealt, the game networking system 120b may reveal the remaining community cards to the player (e.g., the turn card and the river card) without revealing the remaining community cards to the player's opponent. In this way, the player may determine the strength of his hand (a partial result of the hand) before the player's opponent completes his turn.

At operation 804, based on a performing by a second player of a second action in the round of the game, the game networking system 120b reveals a final result of the round of the game to the first player and the second player. Here, the revealing of the final result includes the revealing of the second result to the second player. For example, after second player places a bet in the modified form of the Texas Hold'Em game, thereby completing the betting action for the round, the final result of the hand, including the strength of the first player's hand (the partial result) and the strength of the second player's hand is revealed to both players. Furthermore, the game networking system 120b may declare a winner of the round based on the final result.

Figure 9:
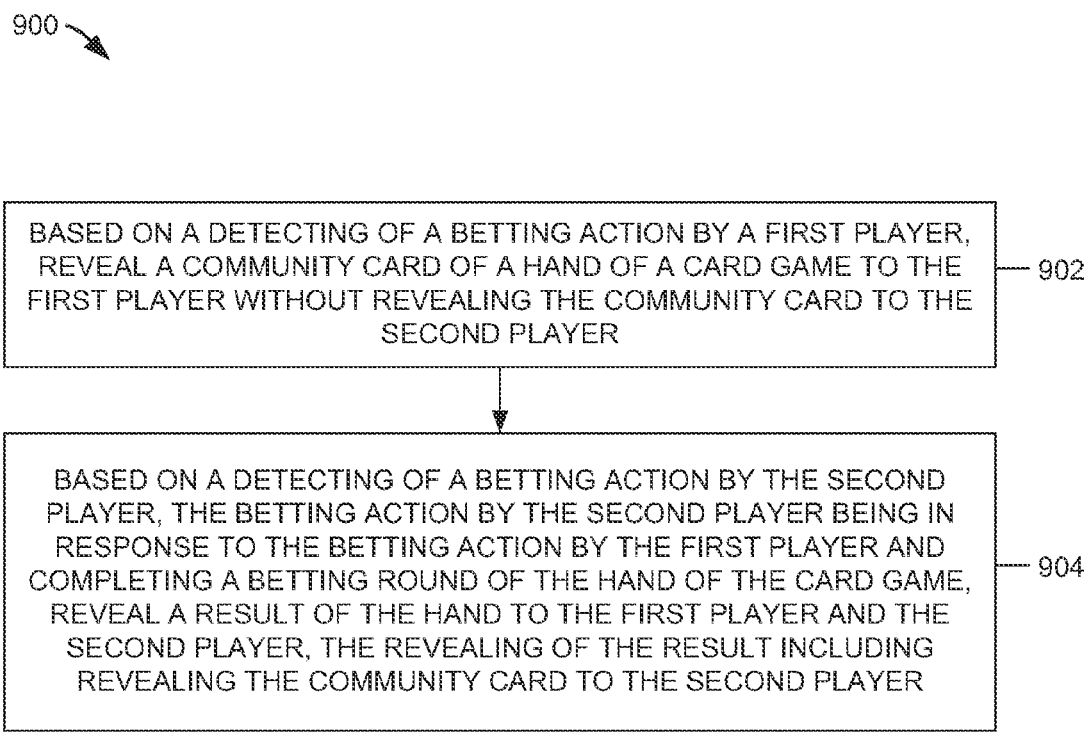
FIG. 9 is a flowchart illustrating an example method of revealing portions of a hand to a first player white the first player waits for a second player to perform a second action in response to the first player performing a first action.

FIG. 9 is a flowchart illustrating an example method 900 of revealing portions of a hand to a first player white the first player waits for a second player to perform a second action in response to the first player performing a first action. At operation 902, based on a detecting of a betting action by a first player, the game networking system 120b reveals a community card of a hand of a card game to the first player without revealing the community card to the second player. For example, based on the first player completing a betting action of a single betting round of a modified form of a Texas Hold'Em game, the game networking system 120b reveals any of the five community cards to the first player without revealing the turn card or the river card to the second player.

At operation 904, based on a detecting of a betting action by the second player being performed in response to the betting action by the first player and completing a betting round of the hand of the card game, the game networking system 120b reveals a result of the hand to the first player. and the second player. The revealing of the result includes revealing the community card to the second. player. For example, based on the second player performing a betting action that completes a single betting round of a modified form of a Texas Hold'Em game, the game networking system 120b reveals the strengths of the hands of the first player and the second player, which includes revealing the same community card to the second player that was revealed to the first player at operation 902.

1-On-1 Poker Module

A 1-On-1 Poker module 306 may implement a 1-On-1 Poker game. The 1-On-1 Poker game may be a modified form of a Texas Hold'Em card game. The 1-On-1 Poker game may be generated or configured by the game generating module 302 or developed separately by a game developer, The integrating module 301 may integrate the 1-On-1 Poker game into the game networking system 120b as a primary game or as a secondary game.

Figure 10A:
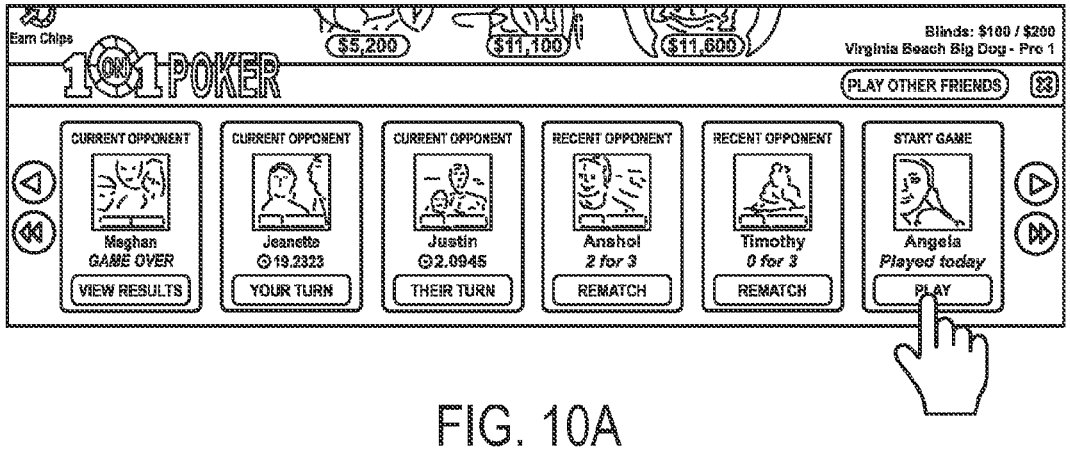
FIG. 10A is a screenshot illustrating an example embodiment of a user interface for a lobby.

FIG. 10A is a screenshot illustrating an example embodiment of a user interface for a lobby 1000. The 1-On-1 Poker module 306 may enable a player to access the lobby 1000 of the 1-On-1 Poker game via a user interface, For example, the 1-On-1 Poker module 306 may integrate a first user interface element (e.g., a "1-On-1 Poker" button) into a second user interface element (e.g., a side navigation pane) of a primary game and then display the lobby 1000 of the 1-On-1 Poker game based on a detection of the user activating the first user interface element. In various embodiments, the 1-On-1 Poker module 306 may display the lobby 1000 automatically, based on, for example, a detection of the player being idle with respect to a primary game.

The lobby 1000 may enable a player to initiate new games or participate in or view information about current or past games. For example, for a current game or past game, the 1-On-1 Poker module 306 may display various information about the game, including information about the relationship between the player and his opponent (e.g., whether the player's opponent in the game is a recent opponent or a current opponent), a picture of the opponent (e.g., extracted from the social networking system 120c (e.g., Facebook) in which the opponent maintains a profile), the name of the opponent, and the status of the game (e.g., a time remaining to act or an indication that the game is over). If the player has not yet reviewed the results of a completed game, the 1-On-1 Poker module 306 may display a user interface element (e.g., a "VIEW RESULTS" button) and then display the results of the game based on a detecting of the activating of the user interface element by the player.

After the player has viewed the results of a completed game, the 1-On-1 Poker module 306 may replace the user interface element for viewing the results of the game with a user interface element (e.g., a "REMATCH" button) for initiating a new game (e.g., a rematch) with the opponent. Additionally, the 1-On-1 Poker module 306 may change the status of the game from "GAME OVER" to a summary of results of a previous set of games with the opponent (e.g., "2 for 3," meaning the player has won two of the last three games with the opponent).

For a current game, if it is the player's turn to act, the 1-On-1 Poker module 306 may display the time remaining (e.g., "18.23.23") for the player to act. Additionally, the 1-On-1 Poker module 306 may display a user interface element (e.g., a "YOUR TURN" button) and then replace the lobby 1000 with a game action screen (described below) based on a detection of an activating of the user interface element by the player.

To enable a player to initiate a new game, the 1-On-1 Poker module 306 may present information about one or more suggested games. For each suggested game, this information may include an indicator of the suggested action (e.g., a "START GAME" label), a picture of a suggested opponent, a name of the suggested opponent, information pertaining to past actions of the suggested opponent with respect to the game (e.g., "Played today"), and a user interface element (e.g., a "PLAY" button) by which the player can initiate a game with the suggested opponent. The 1-On-1 poker module 306 may launch a game-initiation screen (e.g., a game initiation screen 1000 described below with respect to FIG. 11A) based on a detecting of a activating of the corresponding user interface element by the player.

The 1-On-1 Poker module 306 may select one or more in-game or out-of-game friends of the player to present to the player as suggested opponents. The selection of a friend may be based on various criteria, such as information about previous engagement level between the player and the friend (e.g., whether the friend is a current or recent opponent of the player), information about previous requests sent by the player to initiate new games (e.g., whether the player has an outstanding request to the friend to play a game), information about an amount of virtual currency that the player or the friend has for wagering with respect to the game (e.g., whether the player or the friend has more than 0 in virtual currency), information about a level of interest of the friend in the game (e.g., how often the friend has played the game before against other players), an in-game level (e.g., experience points) of the friend, past play history of the friend, play style of the friend, skill of the friend, location of the friend, gender of the friend, and so on, The 1-On-1 Poker module 306 may also select one or more opponents for the player who are not in-game or out-of-game friends of the player based on various criteria, including the criteria discussed above with respect to selection of friends of the player, degree of relationship of the non-friend with respect to the player or friends of the player, or other criteria.

The 1-On-1 Poker module 306 may sort the suggested games for presentation within the lobby 1000 based on various criteria. For example, the 1-On-1 Poker module 306 may sort the suggested games based on any of the selection criteria described above, such as the level of interest of a corresponding suggested opponent in the game. The 1-On-1 Poker module 306 may present a subset (e.g., 6) of the suggest games (e.g., in a scrollable view of the suggested games).

The 1-On-1 Poker module 306 may provide a user interface element (e.g., a "PLAY OTHER FRIENDS") button by which a player can select additional in-game or out-of-game friends (e.g., friends not selected as suggested opponents) to request as opponents for a new game. Upon detecting an activating by the player of the corresponding user interface element, the 1-On-1 Poker module may receive a selection of friends from the player via a separate friend-selection user interface (described below with respect FIG. 13).

Figure 10B:
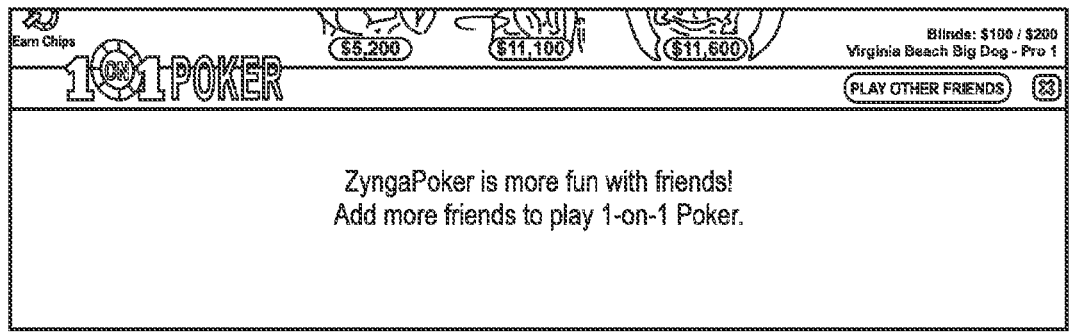
FIG. 10B is a screenshot illustrating an example embodiment of a user interface for a lobby.

FIG. 10B is a screenshot illustrating an example embodiment of a user interface for a lobby 1040. The 1-On-1 Poker module 306 may display the lobby 1040 when it is unable to suggest any games (e.g., based on a determination that none of the friends of the player meet the criteria described above). In this case, the 1-On-1 Poker module 306 may present a message recommending that the player add more friends. The 1-On-1 Poker module 306 may also launch a separate friend-selection user interface (described below with respect to FIG. 13) based on a detecting of an activating of a user interface element of the lobby 1040 by the player.

Figure 10C:
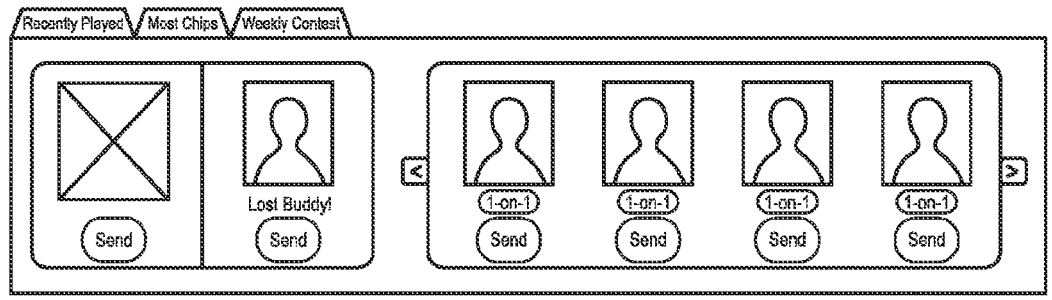
FIG. 10C is a screenshot illustrating an example embodiment of a user interface for a challenge screen.

FIG. 10C is a screenshot illustrating an example embodiment of a user interface for a challenge screen 1080. The 1-On-1 Poker module 306 may present the challenge screen 1080 instead of or in addition to a user interface for a lobby (e.g., the lobby 1040) of the 1-On-1 Poker game. The it Poker module 306 may integrate the challenge screen 1080 into a portion of a user interface of a primary game (e.g., in a navigation pane of a user interface for a live multi-player card game). Or the 1-On-1 Poker module 306 may present the user interface as a standalone interface that is separate from other games.

The challenge screen 1080 includes information about friends of a player of the 1-On-1 Poker game to which the player may submit a request to play a 1-On-1 Poker game. The friends of the player may be organized into groups, such as friends that have most recently played a 1-On-1 Poker game, friends that have the most virtual currency poker chips or other virtual currency), or friends that are participating in a weekly contest pertaining to the 1-On-1 Poker game. The information about each friend my include a picture of a friend, the name of the friend, a length of time since the friend played a game, the number of chips of the friend, the ranking of the friend in a weekly contest, and so on. The information about each friend may be presented in scrollable sets of user interface elements.

The user interface elements may include a user interface element (e.g., a "1-on-1" button) for each friend. Based on a detection of an interaction by the player with respect to the user interface element (e.g., a clicking by the player on a "1-on-1" button corresponding to a friend), the 1-On-1 Poker module 306 may launch a game-initiation screen 1100 described below with respect to FIG. 11A.

Figure 11A:
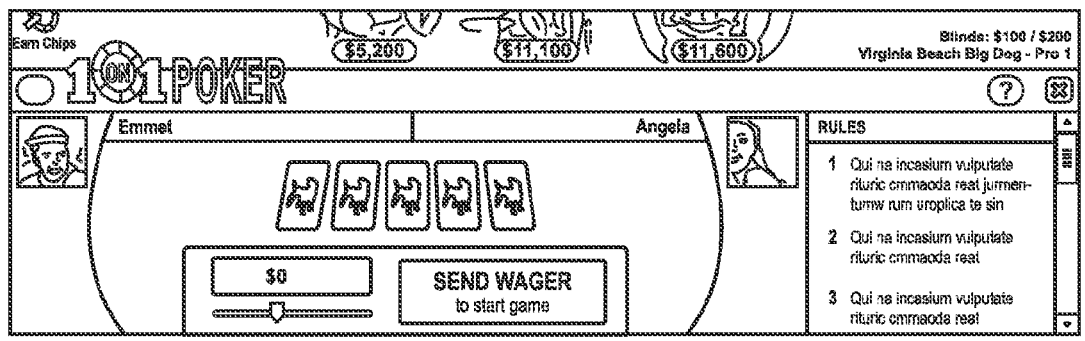
FIG. 11A is a screenshot illustrating an example embodiment of a user interface for the game-initiation screen.

FIG. 11A is a screenshot illustrating an example embodiment of a user interface for the game-initiation screen 1100. The 1-On-1 Poker module 306 may present the game initiation screen 1100 when the player submits a request to initiate a new game with an opponent (e.g., via the lobby 1000 or the challenge screen 1080). The game-initiation screen 1100 may include information about the challenger or challengee (e.g., a name or picture of the challenger or challengee). The game-initiation screen 1100 may also include information pertaining to the game (e.g., the rules of the game). The game-initiation screen 1100 includes a wager box into which a player may specify a wager amount. The player may enter the wager amount directly into the box or use a scroll control to specify or adjust the wager amount. The game initiation screen 1100 includes a user interface element a "SEND WAGER" button) by which the player may send a challenge notification, including the specified wager amount, to a friend. The user interface element for initiating challenges may be disabled until the player specifies a wager amount into the wager box. The 1-On-1 Poker module 306 may enforce a minimum wager amount (e.g., $100 off-table chips) or a maximum wager amount (e.g., $2500 of off-table chips). For example, the 1-On-1 Poker module may inactivate the user interface element for sending a challenge unless the player specifies a valid wager amount. The wager amount may be virtual currency that the player owns with respect to the game networking system 120*b* (e.g., gold coins) or virtual currency that the player owns with respect to the primary game poker chips being used by the player in the primary game). The 1-On-1 Poker module 306 may place the wager amount into escrow until an opponent denies the challenge request or the secondary game is completed and the wager amount is distributed among the winners of the secondary game.

Figure 11B:
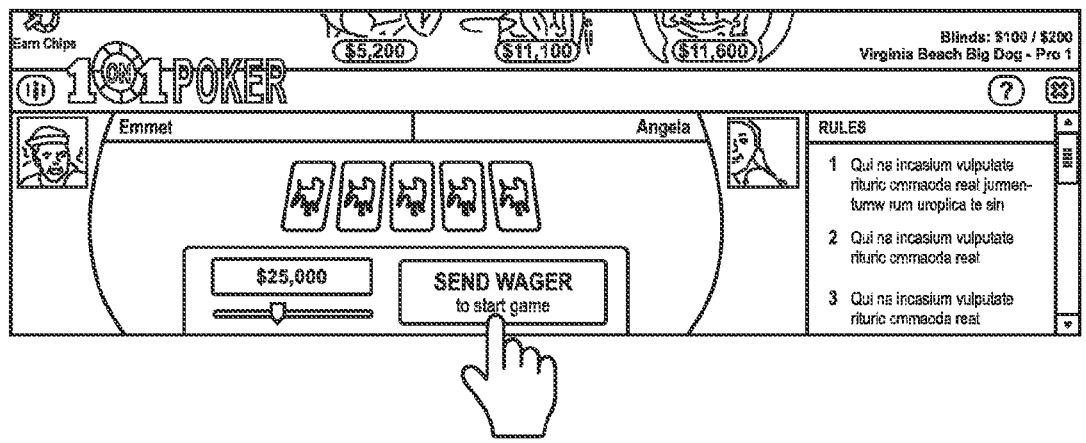
FIG. 11B is a screenshot illustrating an example embodiment of a user interface for a game-initiation screen.

FIG. 11B is a screenshot illustrating an example embodiment of a user interface for a game-initiation screen 1150. The game-initiation screen 1150 is similar to the game-initiation screen 1100 except that a user interface element (e.g., a "SEND WAGER" button) by which a player may initiate a challenge with a friend is enabled based on the player entering a wager amount (e.g., "$25,000") into the wager box.

Upon initiation of a new game, the 1-On-1 Poker module 306 may determine starting stacks of poker chips 1,000 poker chips each) for the challenger and the challengee. The 1-On-1 Poker module 306 may also determine blind amounts (e.g., a big blind amount of 100 and a small blind amount of 0). For example, the 1-On-1 Poker module 306 may determine a big blind amount based on a percentage (e.g., 10%) of the starting stack size. The 1-On-1 Poker module 306 may require the challenger to post the big blind amount in the first hand of the game; thus, the 1-On-1 Poker module 306 may move the big blind amount from the challenger's stack into the pot for the hand.

Figure 12A:
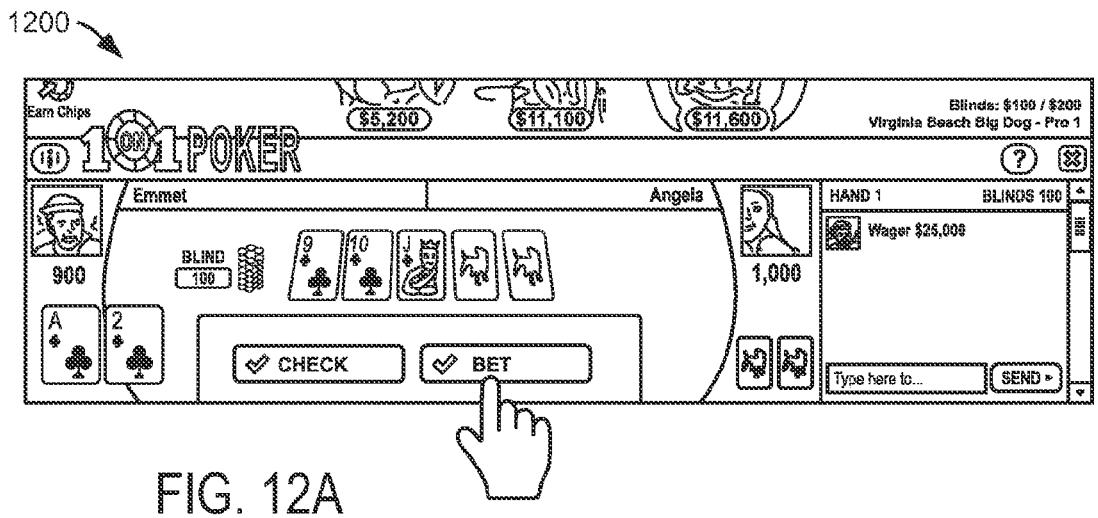
FIG. 12A is a screenshot illustrating an example embodiment of a user interface for an action screen.

FIG. 12A is a screenshot illustrating an example embodiment of a user interface for an action screen 1200. The 1-On-1 Poker module may present the game action screen 1200 to a player based on the player initiating a challenge with a friend (e.g., via the game-initiation screen 1150). The game action screen 1200 may show the number of poker chips in the stack of the challenger, in the stack of the challengee, and in the pot. The game action screen 1200 may also show the size of the current blinds (e.g., "100" for the big blind). The game action screen 1200 may depict the posting of a blind by showing the blind amount being moved into the pot.

The action screen 1200 may reveal a portion of a hand to the challenger (e.g., the player's hole cards and the flop) without revealing that portion to the challengee. The action screen 1200 may then present user interface elements (e.g., a "CHECK" button or a "BET" button) to enable the challenger to perform an action (e.g., check or bet) based on the revealing of the portion of the hand. The 1-On-1 Poker module 306 may make a determination regarding which portion of the hand to reveal to the challenger (e.g., the hole cards, the flop, the turn, or the river) before enabling the challenger to perform an action. This determination may be based on a level of interactivity of the 1-On-1 Poker game in relation to a level of interactivity of a primary game.

The action screen 1200 may include a chat window. The 1-On-1 Poker module 306 may insert messages into the chat window on behalf of a player based on the player performing an action. For example, when a player performs an action, the 1-On-1 Poker module 306 may insert text into the chat window on behalf the player describing the action (e.g., "Wager $25,000" or "Bet 400"). The action screen 1200 may include a box into which a user may enter additional messages for inclusion into the chat window.

The action screen 1200 may present information about the players, including their names, the number of chips in their stacks, and their pictures. The action screen 1200 may present a textual or a graphical representation of each player's hole cards or the community cards. The action screen 1200 may present a graphical representation of a back of a card for cards that have not been exposed to the player who is presented with the action screen 1200. Thus, the action screen 1200 may display two card backs to represent a player's unexposed hole cards until the hole cards are revealed (e.g., based on a hand ending in a show down or based on the player choosing to reveal his cards).

Figure 12B:
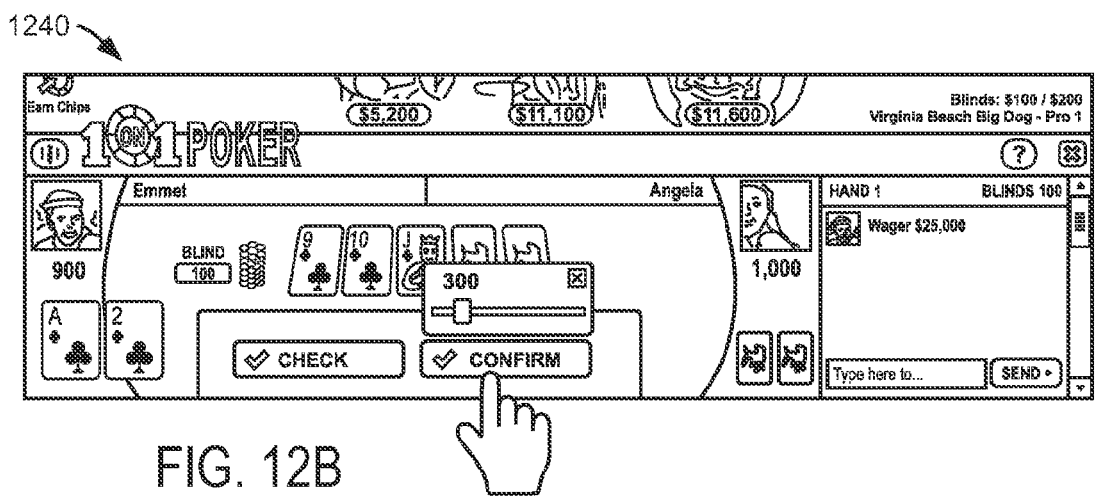
FIG. 12B is a screenshot illustrating an example embodiment of a user interface for an action screen.

FIG. 12B is a screenshot illustrating an example embodiment of a user interface for an action screen 1240. The action screen 1240 shows the result of the challenger indicating a desire to place a bet (e.g., clicking on the "BET" button of action screen 1200). For example, the action screen 1240 includes a pop-up scroll box that enables the challenger to specify an amount of the bet and a user interface element (e.g., a "CONFIRM" button) to enable the challenger to confirm the amount of the bet.

Figure 12C:
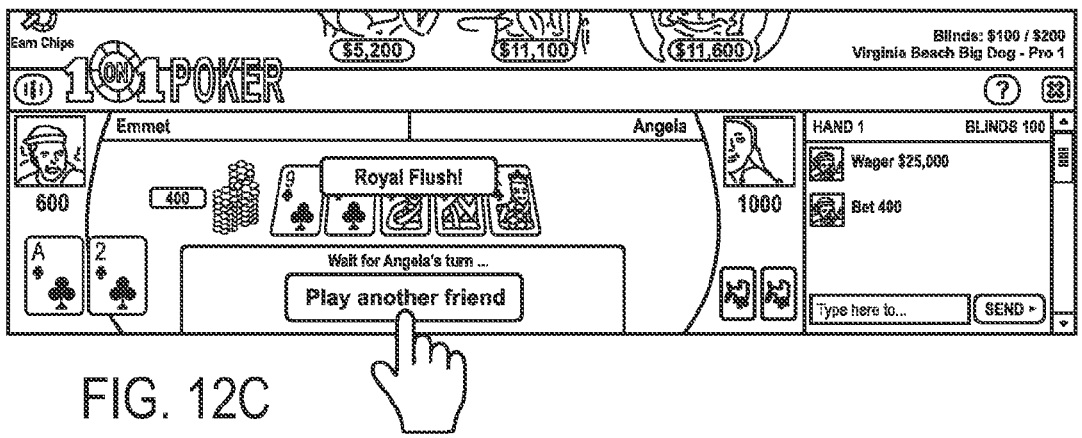
FIG. 12C is a screenshot illustrating an example embodiment of a user interface for an action screen.

FIG. 12C is a screenshot illustrating an example embodiment of a user interface for an action screen 1280. Based on the challenger performing an action with respect to the game (e.g., placing a bet or checking), the action screen 1280 shows a partial result of the hand without revealing the partial result to the challengee. For example, the action screen 1280 may reveal any community cards not revealed previously. For example, if the action screen 1280 did not reveal the turn card and river card before the challenger performed an action, the action screen 1280 may reveal the turn card and the river card. In this way, the challenger may see a partial result of the hand (e.g., the strength of his hand), but not see a complete result of the hand (e.g., the challengee's hole cards, the challengee's action (e.g., check, raise, or fold) in response to the challenger's, or a winner of the hand). After displaying the partial result of the hand, the action screen 1280 may present a user interface element (e.g., a "Play another friend" button) to enable a player to challenge another friend to a game.

Figure 13:
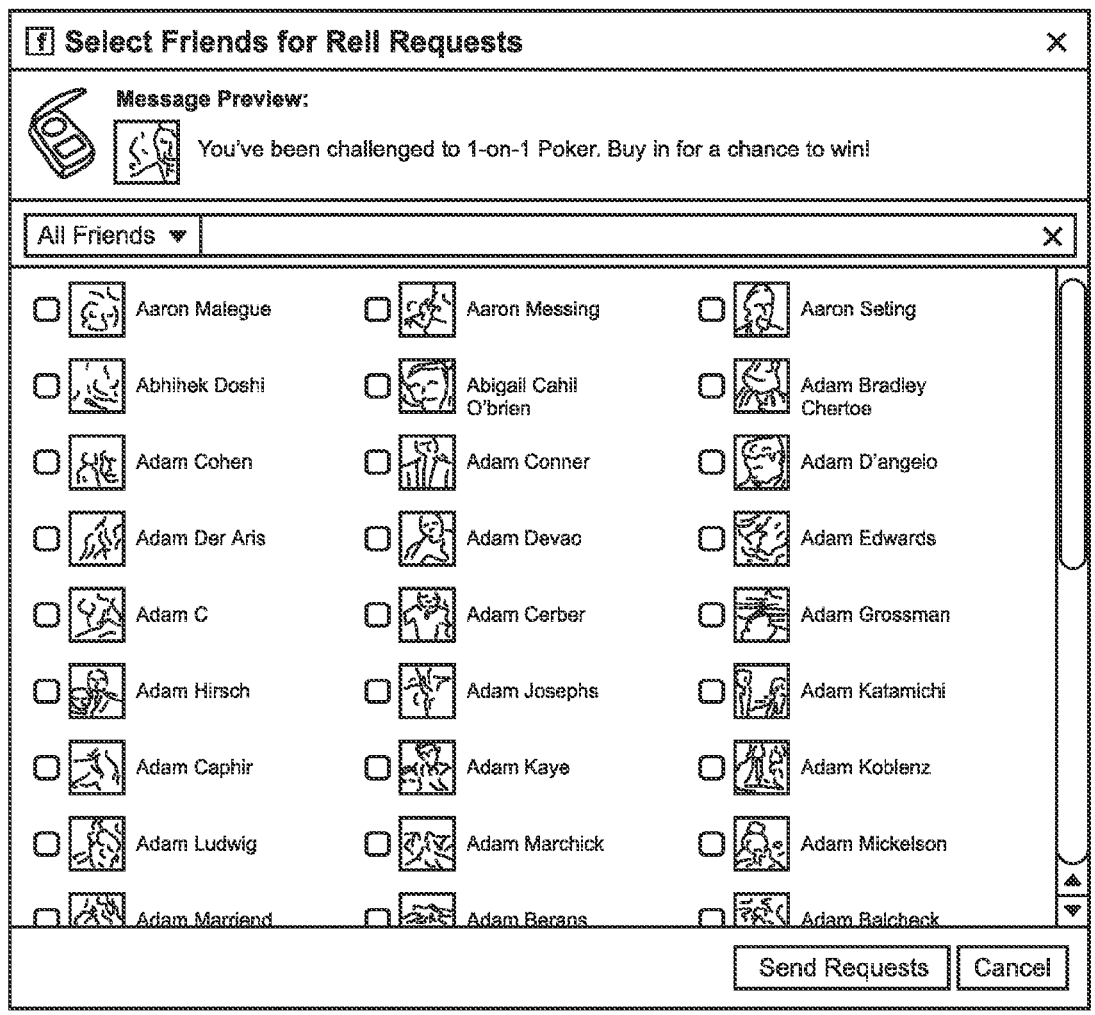
FIG. 13 is a screenshot illustrating an example embodiment of a user interface for a friend-selection screen.

FIG. 13 is a screenshot illustrating an example embodiment of a user interface for a friend-selection screen 1300. The 1-On-1 Poker module 306 may present the friend-selection screen 1300 based on a request from a player to challenge a friend to a game (e.g., based on the player clicking the "Play another friend" button of the action screen 1280 or clicking the "PLAY OTHER FRIENDS" button of the game-initiation screen 1000). The friend-selection screen may present a preview of a message that is to be sent to each selected friend (e.g., "You've been challenged to 1-on-1 Poker. Buy in for a chance to win!"), The friend-selection screen 1300 includes a drop-down box and a text box for filtering the player's friends. The friend-selection screen 1300 includes a scrollable list of the player's friends, including information about each friend, such as the name of the friend or a picture of the friend. The friend-selection screen 1300 includes check boxes next to each of the names of the friends such that the player may select each of the friends for receiving the challenge request. The friend-selection screen 1300 includes a "Send Requests" button for sending the challenge request to each of the selected friends.

Figure 14A:
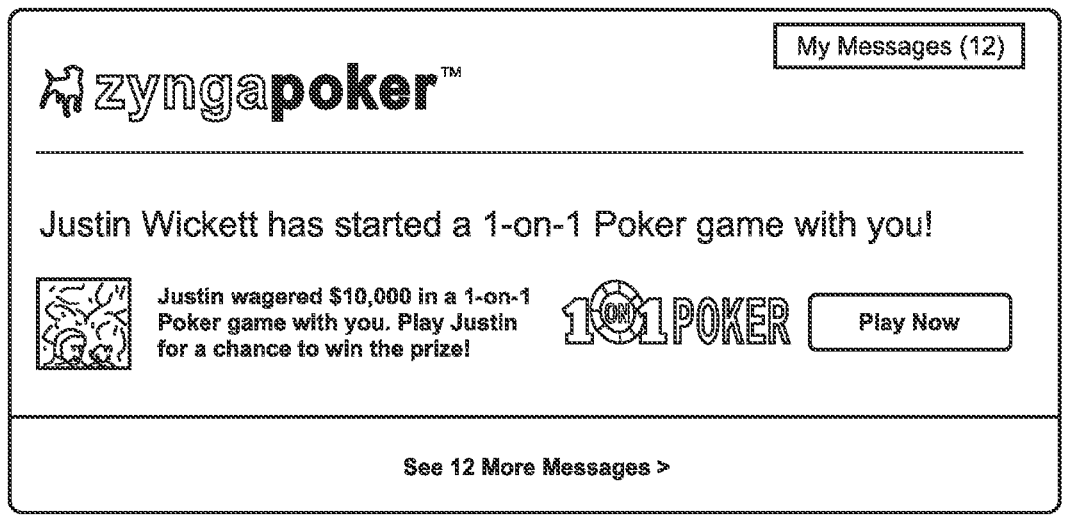
FIG. 14A is a screenshot illustrating an example embodiment of a user interface of a challenge notification to a challengee.

FIG. 14A is a screenshot illustrating an example embodiment of a user interface of a challenge notification 1400 to a challengee (e.g., via the social networking system 120*a*). The 1-On-1 Poker module 306 may send the challenge notification 1400 to a challengee based on, for example, a challenger submitting a request via the friend-selection module 1300 or the game initiation screen 1000. The challenger notification 1400 may include information about the challenger (e.g., the name of the challenger) and the challenge (e.g., the name of the game or the amount of the wager). The challenge notification may include a user interface element (e.g., a "Play Now" button) to enable the challengee to accept the challenge. The 1-On-1 Poker module 305 may present the challenge notification 1400 as one of a series of messages sent to the challengee. Thus, the challenge notification 1400 may include user interface elements to enable the challengee to view other messages or view a number of unread messages or a total number of messages in the challengee's message box.

Figure 14B:
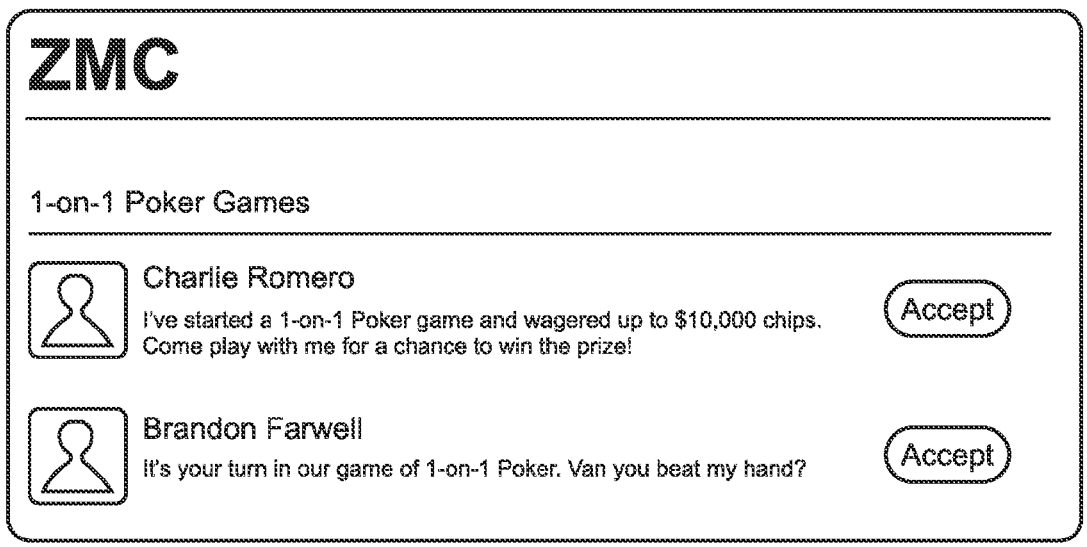
FIG. 14B is a screenshot illustrating an example embodiment of user interface for presenting a challenge notification list to a player.

FIG. 14B is a screenshot illustrating an example embodiment of user interface for presenting a challenge notification list 1450 to a player (e.g., via message center pertaining to the game networking system 120*b*). The 1-On-1 Poker module 306 may present the challenge notification list 1405 to a challengee based on, for example, a challenger submitting a request via the friend-selection module 1300 or the game initiation screen 1000. The challenge notification list 1450 may be sorted by game type "1-on-1 Poker Games"). The game networking list 1450 may include information about each challenge, including the name of the challenger, information about the challenge (e.g., the type of game or the amount wagered by the challenger), or information about a status of a challenge (e.g., a notification that the challenger has completed an action within the game or that it is the challengee's turn to perform an action). The challenge notification list 1450 may include a user interface element (e.g., an "Accept" button) that enables the challengee to accept the challenge.

Figure 15A:
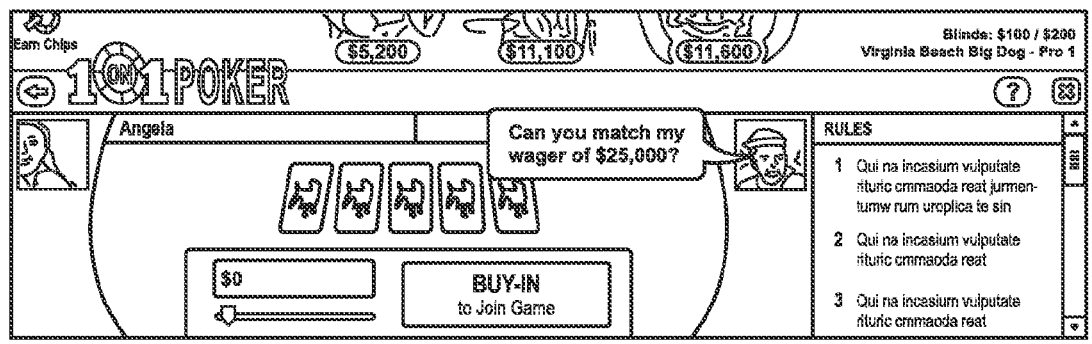
FIG. 15A is a screenshot illustrating an example embodiment of a user interface for challenge-accepting screen.

FIG. 15A is a screenshot illustrating an example embodiment of a user interface for challenge-accepting screen 1500. The 1-On-1 Poker module 306 may present challenge-accepting screen 1500 to a challenger based on, for example, the challengee indicating an interest in accepting a challenge request from a challenger.

The challenge-accepting screen 1500 includes information about the challenge, such as an amount of a wager proposed by a challenger and the rules of the challenge. The challenge-accepting screen 1500 includes a buy-in box in which the challengee may enter a buy-in amount, The 1-On-1 Poker module 306 may limit the buy-in amount entered by the challenger to a maximum amount that is equal to the amount of the wager proposed by the challenger. For example, if the challenger proposes a $25,000 wager, the challenger may be able to enter any buy-in that is greater than zero and less than or equal to $25,000. The challenge-accepting screen 1500 may include a slider control to enable the challengee to specify a buy-in amount by moving the slider instead of typing text into the buy-in box. The challenge-accepting screen 1500 may include a user interface element (e.g., a "BUY-IN" button) to enable the challengee to buy-in to the game with a specified wager amount. The user interface element may be disabled (e.g., grayed out) until the challengee enters a valid buy-in amount into the buy-in box. If the challengee buys in for an amount that is less than the buy-in amount proposed by the challenger, the challenge may be refunded the difference between the challenger's proposed buy-in amount and the buy-in amount accepted by the challengee. The 1-On-1 Poker module 306 may keep the sum of the agreed-upon buy-in amounts in escrow until the funds are distributed to the winner(s) of the game.

Figure 15B:
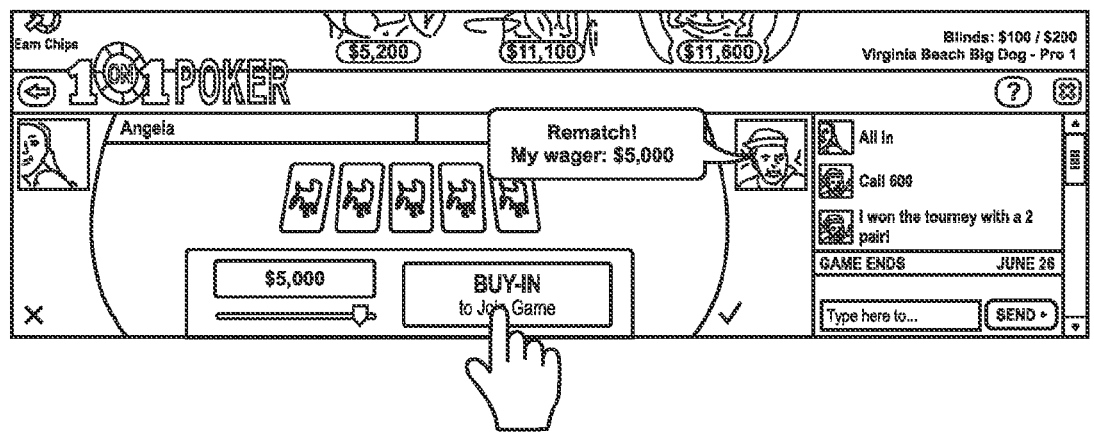
FIG. 15B is a screenshot illustrating an example embodiment of a user interface for challenge-accepting screen.

FIG. 15B is a screenshot illustrating an example embodiment of a user interface for challenge-accepting screen 1550. The 1-On-1 Poker module 306 may present challenge-accepting screen 1550 to a challengee based on, for example, a challenger proposing a rematch of a game, The challenge-accepting screen 1550 may include a chat box that includes messages communicated between the challenger and the challengee over one or more previously completed games between the challenger and the challengee. For example, during a game, the 1-On-1 Poker module 306 may automatically add messages to the chat box on behalf of each player that correspond to actions performed by each player during the game. Thus, in a previous game, when Angela made an all-in bet, the 1-On-1 Poker module 306 added a message to the chat box on behalf of Angela stating "All in." When Emmet called Angela's all-in bet, the 1-On-1 Poker module 306 added a message to the chat box on behalf of Emmet stating "Call 600." When Emmet won the hand, the 1-On-1 Poker module 306 added a message to the chat box on behalf of Emmet stating "1 won the tourney with 2 pair." Additionally, each player may be able to enter additional messages into the chat box by entering text into the corresponding text box and clicking the "SEND" button, The messages from this (previous game as well as other previous games between the challenger and the challengee may be saved and made accessible in the chat window (e.g., via a scroll bar). Thus, when making or accepting a. challenge, the challenger or challengee may be able to review the chat from the previous games to be reminded of a context of the challenge with respect to previous games played.

Figure 16A:
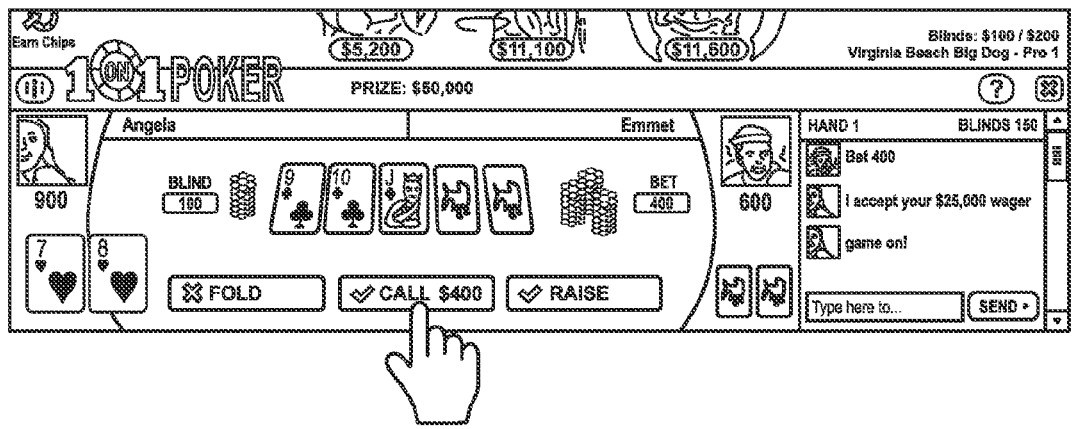
FIG. 16A is a screenshot illustrating an example embodiment of a user interface for an action screen.

FIG. 16A is a screenshot illustrating an example embodiment of a user interface for an action screen 1600. The 1-On-1 Poker module 306 may present action screen 1600 to a player based on, for example, the player indicating an interest in taking his turn within the game. The action screen 1600 may include information pertaining to the game, including a prize (e.g., $50,000, the sum of the amount wagered by the player and his opponent), an amount of a blind that has been posted by the player, an amount of a bet by the player's opponent, an amount of chips remaining for the player, an amount of chips remaining for the player's opponent, the player's hole cards, community cards that have been exposed, a number of community cards that have not been exposed, and hole cards of an opponent that have not been exposed.

The action screen 1600 may include user interface elements corresponding to actions that the player may perform. For example, the action screen 1600 may include "FOLD," "CALL," or "RAISE" buttons to enable the player to fold his hand, call his opponent's bet, or raise his opponents bet. If the player chooses to raise his opponent's bet, the 1-On-1 Poker module may automatically call the raise on behalf of the player's opponent. Thus, the 1-On-1 Poker module may ensure that, regardless of the player's action, the current betting round is completed upon that player's action. Therefore, the 1-On-1 Poker module may present the result of the hand upon the player's action without waiting for the player's opponent to perform an additional action (e.g., call the player's raise or make an additional raise). When placing his original bet, the player's opponent may implicitly or explicitly agree to having this action performed automatically on behalf of the player's opponent, thereby enabling a single action by the player to conclude a betting round or hand.

The 1-On-1 Poker module may automatically add messages to the chat box on behalf of the player based on the player's actions. For example, when Angela accepts Emmet's challenge, the 1-On-1 Poker module may automatically enter a message into the chat window on behalf of Angela stating "I accept your $25,000 wager." Additionally, when Angela types a message in a chat window (e.g., "game on!"), the 1-On-1 Poker module enters that message into the chat box. In the chat box, the 1-On-1.Poker module may format messages that are manually entered by a player (e.g., with a green color) to distinguish such messages from messages that are automatically entered into the chat box on behalf of a player (e.g., with a white color).

Figure 16B:
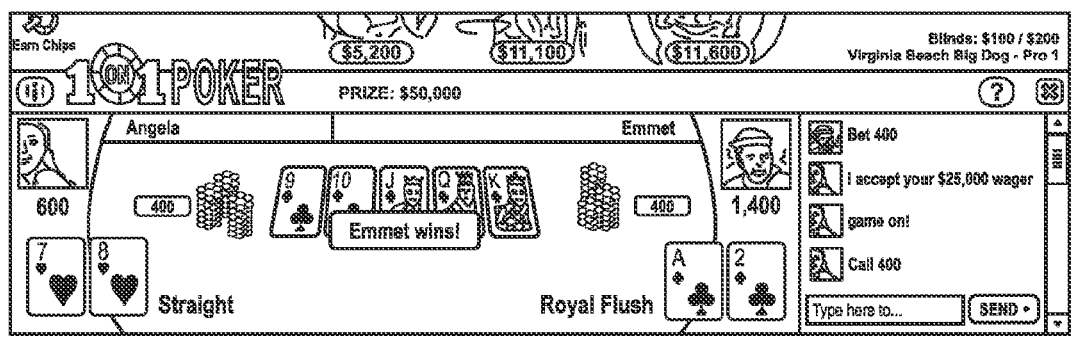
FIG. 16B is a screenshot illustrating an example embodiment of a user interface for a result screen.

FIG. 16B is a screenshot illustrating an example embodiment of a user interface for a result screen 1650. The 1-On-1 Poker module 306 may present the result screen 1650 to a player based on, for example, the player performing an action that concludes a hand of a game. For example, the 1-On-1 Poker module may present the result screen 1650 to Angela when Angela chooses to call a bet by Emmet. The result screen 1650 may show various information pertaining to the result of the hand of the game, such as the hole cards of the players, the community cards, the chips in the pot wagered by each player, the strengths of each player's hand (e.g., "Straight" or "Royal Flush"), and the winner of the hand (e.g., "Emmet wins!").

Figure 17A:
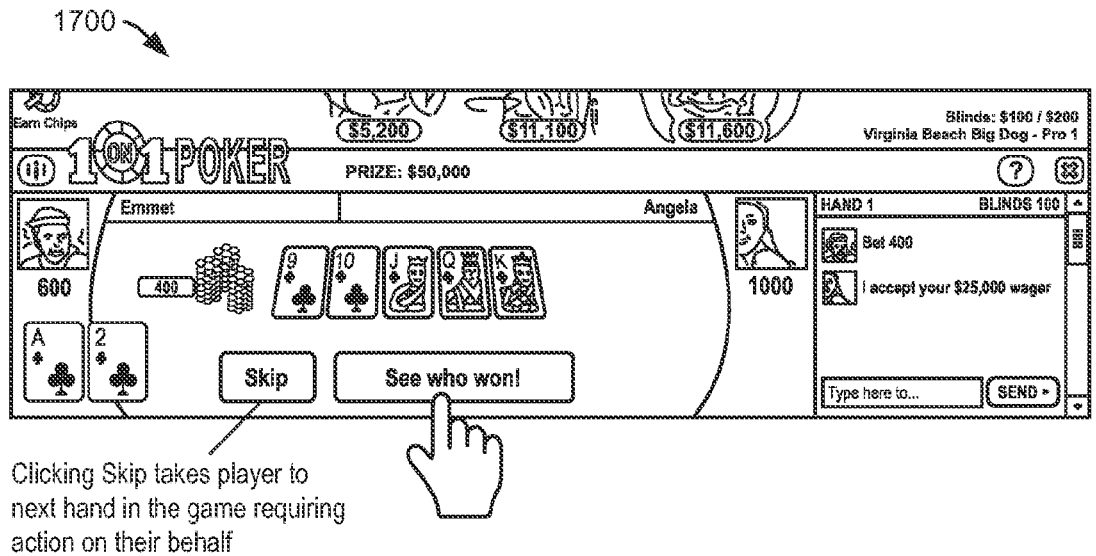
FIG. 17A is a screenshot illustrating an example embodiment of a user interface for a notification screen.

FIG. 17A is a screenshot illustrating an example embodiment of a user interface for a notification screen 1700. The 1-On-1 Poker module 306 may present the notification screen 1700 to a player based on, for example, the player's opponent performing an action that results in a hand of the game being concluded. The notification screen 1700 may include information about the game, such as a prize amount (e.g., $50,000, the sum of the wagers agreed to by the player and his opponent), an amount of a bet previously placed by the player, the player's hole cards, and the community cards. The notification screen 1700 may also include a chat box containing messages entered by the players or on behalf of the players based on actions performed by the players. The notification screen 1700 may include a user interface element (e.g., a "Skip" button) that enables the player to skip the results (e.g., proceed with playing another hand). The notification screen 1700 may also include a user interface element (e.g., a "See who won!" butt)n) that enables the player to view the results of the hand (e.g., via the result screen 1650).

Figure 17B:
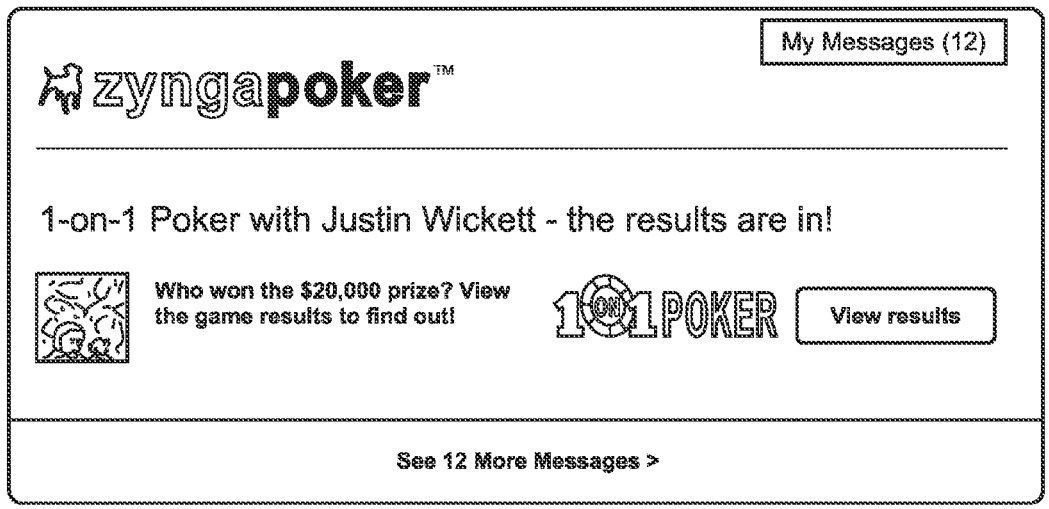
FIG. 17B is a screenshot illustrating an example embodiment of a user interface for a notification message.

FIG. 17B is a screenshot illustrating an example embodiment of a user interface for a notification message 1750. The 1-On-1 Poker module 306 may present the notification message 1750 to a player based on, for example, the player's opponent performing an action that results in a hand of the game being concluded. The 1-On-1 Poker module 306 may present the message to the player via an in-game messaging system (e.g., the Zynga Message Center) or an out-of-game messaging system (e.g., a Facebook inbox or email account). The notification message 1750 may include information about the game, such as the type of the game (e.g., "1-on-1 poker", the name of the player's opponent ("Justin Wicket"), or the amount of the prize (e.g., $20,000). The notification message 1750 may include a user interface element (e.g., a "View results" button) that enables the player to access the results (e.g., via the result screen 1650).

Figure 18A:
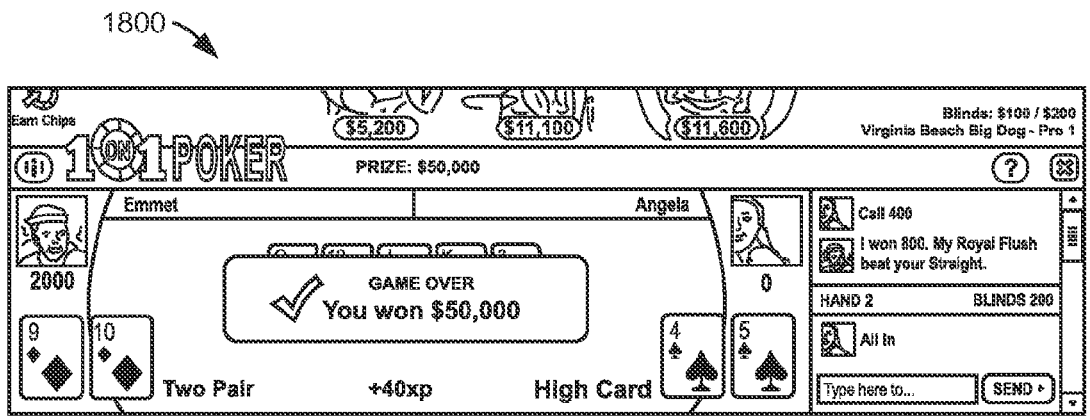
FIG. 18A is a screenshot illustrating an example embodiment of a user interface for a game over screen.

FIG. 18A is a screenshot illustrating an example embodiment of a user interface for a game over screen 1800. The 1-On-1 Poker module 306 may present the game over screen 1800 to a player based on, for example, the player or the player's opponent having no chips remaining. The game over screen 1800 may include information pertaining to the game that is similar to the information included in the result screen 1650. The game over screen 1800 may also include information pertaining to the prize won by the winning player upon completion of the game. For example, the game over screen may indicate the amount of the wager won by the winning player (e.g., "You won $50,000!"). The game over screen may also indicate an amount of experience points gained by the winning player (e.g., "+40xp").

Figure 18B:
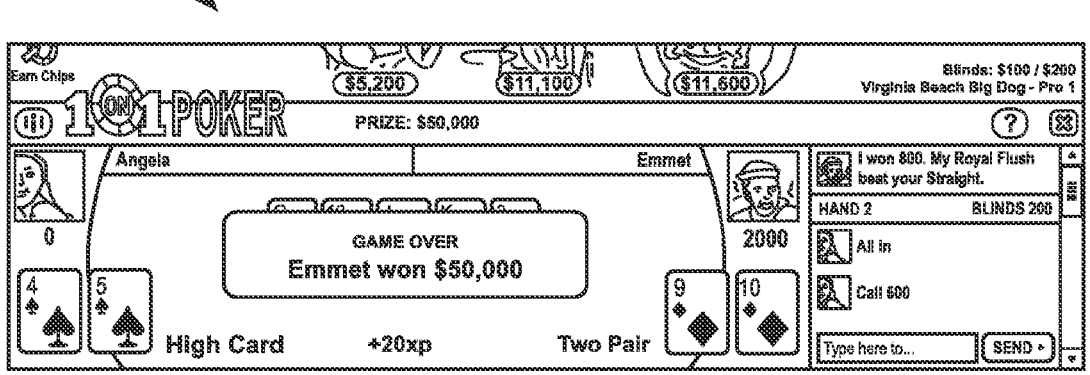
FIG. 18B is a screenshot illustrating an example embodiment of a user interface for a results screen.

FIG. 18B is a screenshot illustrating an example embodiment of a user interface for a results screen 1840. The 1-On-1 Poker module 306 may present the game over screen 1800 to a player based on, for example, the player having no chips remaining. The game over screen 1800 may include information pertaining to the game that is similar to the information included in the result screen 1650. The game over screen 1800 may also include information pertaining to the prize won by the winning player upon completion of the game. For example, the game over screen may indicate the amount of the wager won by the player (e.g., "Emmet won $50,000!") or an amount of experience points gained by the losing player (e.g., "+20xp").

Figure 18C:
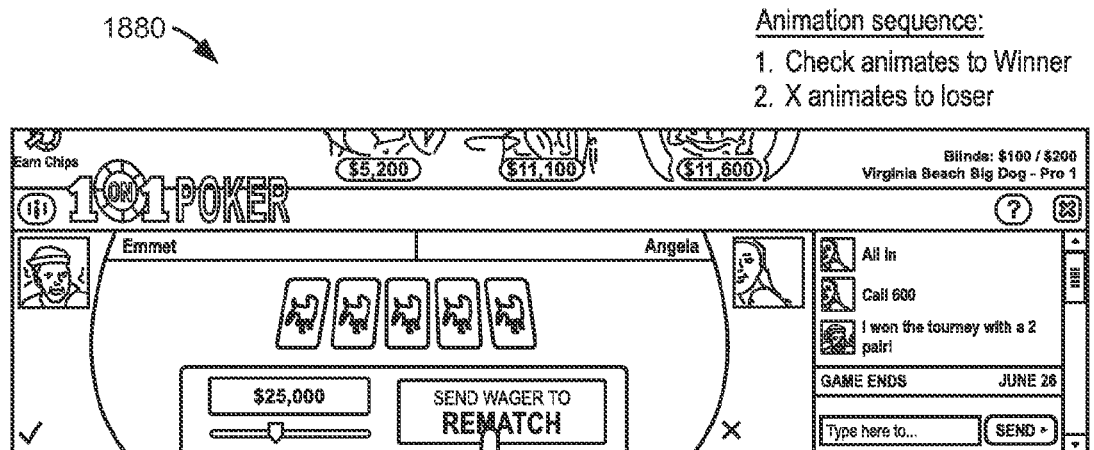
FIG. 18C is a screenshot illustrating an example embodiment of a user interface for a rematch screen.

FIG. 18C is a screenshot illustrating an example embodiment of a user interface for a rematch screen 1880. The 1-On-1 Poker module 306 may present the rematch screen 1800 to a player based on, for example, a game having been concluded between two players. The rematch screen 1880 may be similar to the game-initiation screen 1150, but with a user interface element (e.g., a "REMATCH" button) that enables a player to initiate a rematch taking the place of the user interface element (e.g., a "SEND WAGER" button) that enables the player to initiate a new game.

Figure 19A:
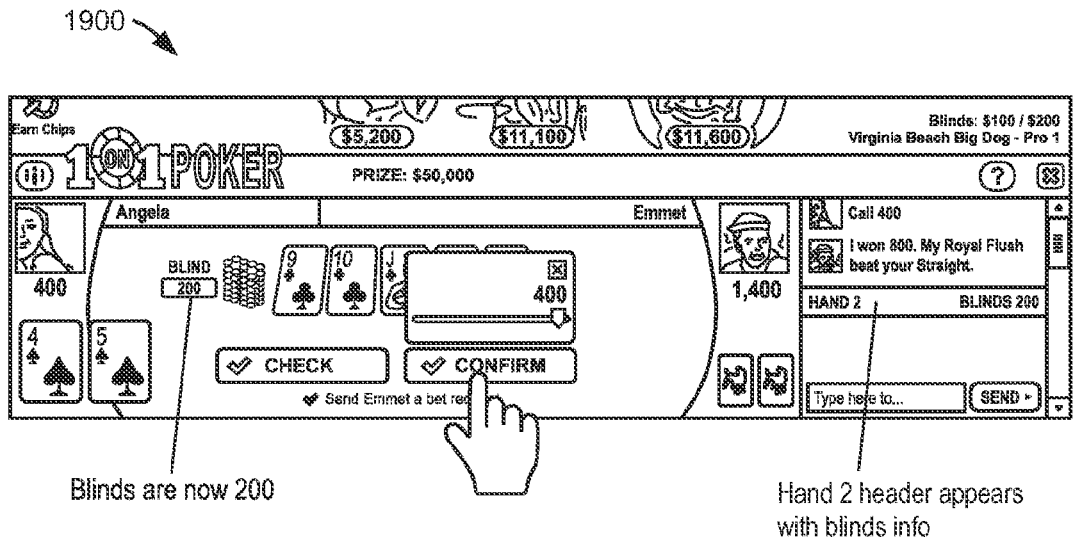
FIG. 19A is a screenshot illustrating an example embodiment of a user interface for an action screen.

FIG. 19A is a screenshot illustrating an example embodiment of a user interface. for an action screen 1900. The 1-On-1 Poker module 306 may present the action screen 1900 to a player based on, for example, a first round of a game being concluded and the cards for a second round of the game being dealt, The action screen 1900 may represent a posting of a new blind amount by the player's opponent. For example, the 1-On-1 Poker module 306 may increase the size of the blinds between hands based on a predetermined blind structure. Thus, the size of the blind amount posted by the player's opponent for the current hand might be larger than the size of the blind amount posted by the player for the previous hand. The action screen 1900 may include user interface elements (e.g., a "CHECK" button or "BET" button (not shown) that enable the player to perform an action, such as check or bet. Upon expressing an interest in placing a bet, the action screen 1900 may prompt the user to specify a bet amount (e.g., with a slider control) or confirm the bet amount by clicking the "CONFIRM" button). The 1-On-1 Poker module 306 may limit the size of the bet to a particular amount (e.g., twice the size of the blind posted by the player's opponent). The 1-On-1 Poker module may place a separator into the chat box to separate chat messages pertaining to the current hand from chat messages pertaining to the previous hand.

Figure 19B:
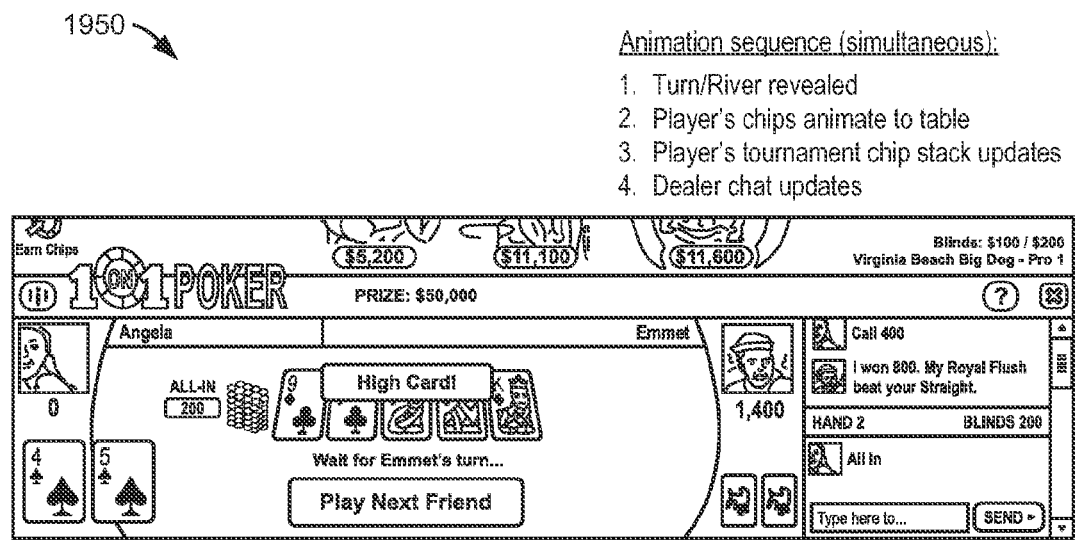
FIG. 19B is a screenshot illustrating an example embodiment of a user interface for a partial result screen.

FIG. 19B is a screenshot illustrating an example embodiment of a user interface for a partial result screen 1950. The 1-On-1 Poker module 306 may present the partial result screen 1950 to a player based on, for example, the player completing his turn in a game. The partial result screen 1950 may expose all of the community cards to the player such that the player can view the strength of his hand before his opponent completes his turn. For example, as depicted in FIG. 19A, Angela may be dealt a four of spades and a five of spades as her two hole cards. The 1-On-1 Poker module 306 may also reveal the first three community cards to Angela. Based on this information, Angela may choose to bet all of her remaining 400 chips, Upon detecting her betting action, the 1-On-1 Poker module 306 may expose, via the partial result screen 1950, the two remaining community cards, Thus, although Angela has seen the strength of her hand, she won't know whether she has won or lost the hand until her opponent, Emmet, completes his turn. Furthermore, the 1-On-1 Poker module may not expose Angela's hole cards or the two remaining cards to Emmet until Emmet completes his turn. The partial result screen 1950 may include a user interface element (e.g., a "Play Next Friend" button) to enable the player to take a turn in an ongoing game with a different friend or challenge a different friend to a new game.

Figure 20A:
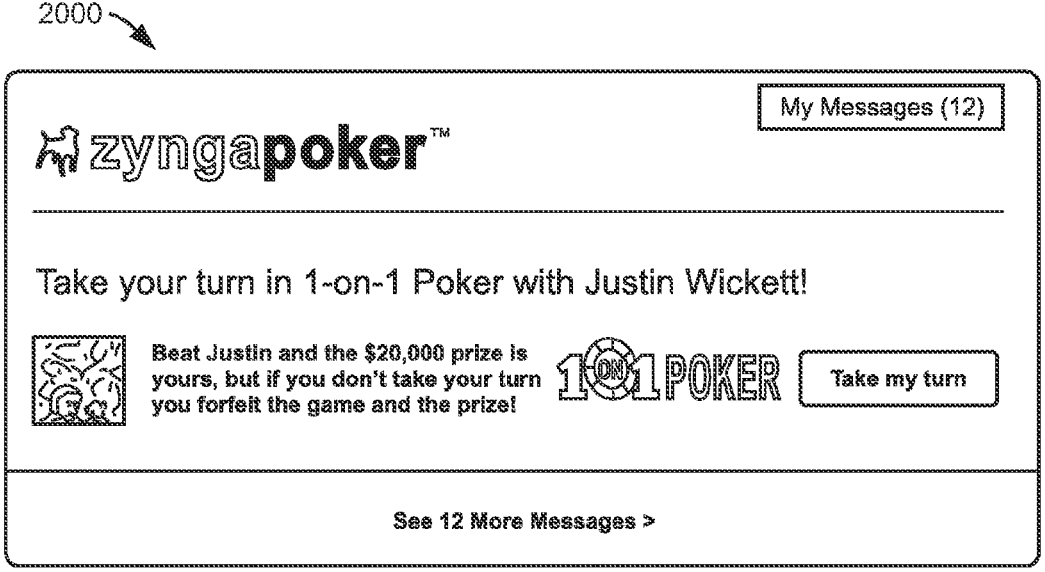
FIG. 20A is a screenshot illustrating an example embodiment of a user interface for a notification message.
Figure 20B:
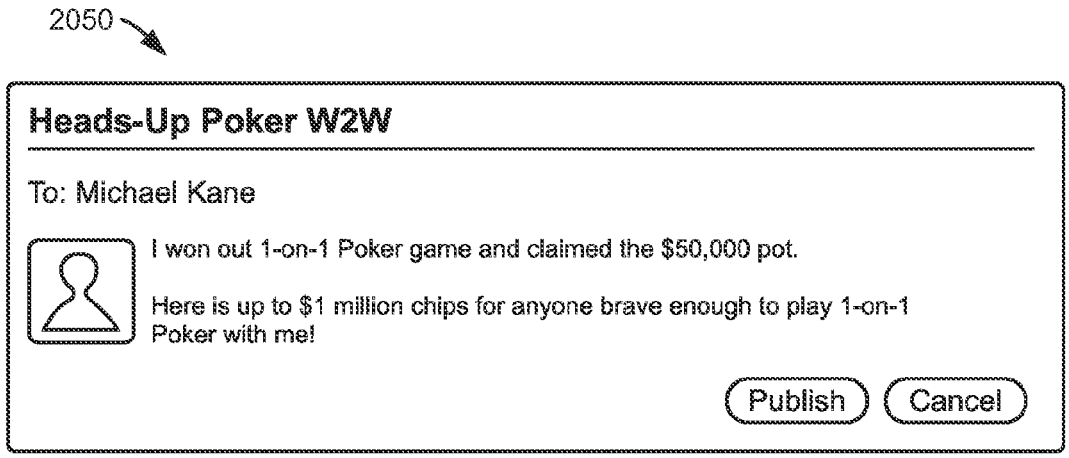
FIG. 20B is a screenshot illustrating an example embodiment of a user interface for a wall-to-wall posting publisher.

FIG. 20 is a screenshot illustrating an example embodiment of a user interface. for a notification message 2000, The 1-On-1 Poker module 306 may present the notification message 2000 to a player based on, for example, it being the player's turn within a game. The 1-On-1 Poker module 306 may present the message to the player via an in-game messaging system (e.g., the Zynga Message Center) or an out-of-game messaging system (e.g., a Facebook inbox or email account). The notification message 200 may include information similar to the information presented in the notification message 1750. The notification message may include a user interface element (e.g., a "Take my turn" button) that enables the player to take his turn within the game (e.g., via the action screen 1600).

FIG. 21 is a screenshot illustrating an example embodiment of a user interface for a wall-to-wall posting publisher 2050. The 1-On-1 Poker module 306 may present the wall-to-wall posting publisher 2050 based on, for example, the player winning a challenge against a friend. The wall-to-wall posting publisher 2050 may include a message pertaining to the game (e.g., a message indicating an amount of prize that the player -won for beating the friend in a challenge) or a message including an incentive for friends of the player's friend to challenge the player to a game. The incentive may include an offer for a random number of chips (e.g., "up to $1 million chips") for anyone willing to challenge the player to a game. The wall-to-wall posting publisher 2050 may include user interface elements to enable the friend to publish the message(s) or cancel the publishing of the message(s) to a wall of the friend on the social networking systems 120a (e.g., on Facebook).

FIGS. 21A-21F depict example embodiments of menu interfaces for enabling a player to play a primary or a secondary game. If the game is played as a secondary game, the menu interface of the secondary game may be integrated into the menu interface of the primary game. For example, the 1-On-1 Poker module 306 may integrate a menu item (e.g., a "Poker With Friends" menu item) corresponding to the main menu of the 1-On-1 Poker game into a menu of a primary game (e.g., a live, real-time, poker game, such as Zynga Poker). The 1-On-1 Poker module may display a user interface element (e.g., a red dot in the upper right-hand corner) the menu item indicating that the player has outstanding requests or actions to perform with respect to the 1-On-1 Poker game.

Figure 21A:
FIG. 21A is a block diagram illustrating an example menu interface in which a pop-up game-initiation screen appears.

FIG. 21A is a screenshot illustrating an example menu interface 2100 in which a pop-up game-initiation screen appears. The 1-On-1 Poker module 306 may present the game-initiation screen based on, for example, a player selecting a menu item corresponding to the 1-On-1 Poker game. The pop-up game-initiation screen presents information about the game (e.g., "1-on-1 Poker") and information about a proposed opponent, such as a picture of the proposed opponent and a name of the proposed opponent. The pop-up game-initiation screen also includes a user interface element (e.g., a "Start New Game" button) that enables the user to send a challenge request to the proposed opponent. The 1-On-1 Poker game may select the proposed opponent (e.g., using the criteria discussed above with respect to FIGS. 10A-10C), The pop-up game-initiation screen may include a user interface element (e.g., an "X" in the upper right-hand corner of the pop-up screen) that enables the user to close the pop-up game-initiation screen. When the user closes the pop-up game-initiation screen, the 1-On-1 Poker module may open a different pop-screen (e.g., a pop-up challenge-accepting screen, action screen, or result screen, described below).

Figure 21B:
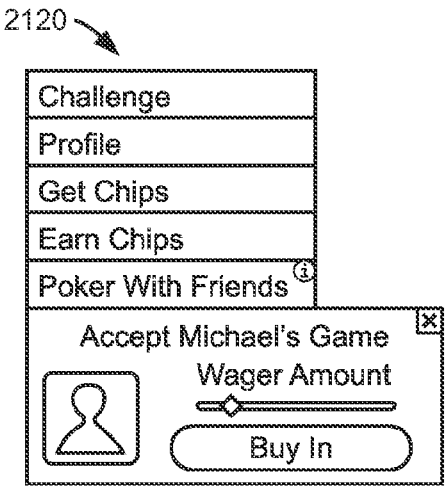
FIG. 21B is a screenshot illustrating an example menu interface in which a pop-up game-accepting screen appears (e.g., when a player selects a menu item corresponding to the 1-On-1 Poker game)

FIG. 21B is a screenshot illustrating an example menu interface 2120 in which a pop-up game-accepting screen appears (e.g., when a player selects a menu item corresponding to the 1-On-1 Poker game). The 1-On-1 Poker module 306 may present the game-accepting screen based on, for example, a player selecting a menu item corresponding to the 1-On-1 Poker game. The game-accepting screen includes a user interface element a slider bar) that enables the player to specify a wager amount. The 1-On-1 Poker module 306 may limit the wager amount to a. value greater than zero and less than or equal to the amount proposed by the challenger. The game-accepting screen may include information about the challenger, including the challenger's name and a picture of the
challenger. For example, the 1-On-1 Poker module 306 may get the picture from a profile of the challenger via the social networking systems 120a.

Figure 21C:
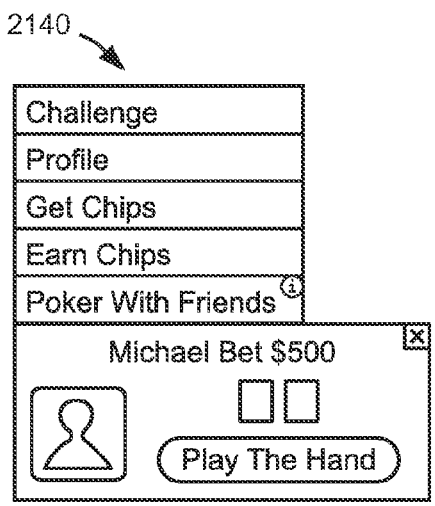
FIG. 21C is a screenshot illustrating an example menu interface in which a pop-up action screen appears.

FIG. 21C is a screenshot illustrating an example menu interface 2140 in which a pop-up action screen appears. The 1-On-1 Poker module 306 may present the action screen based on, for example, a player selecting a menu item corresponding to the 1-On-1 Poker game. The action screen may present information pertaining to an action performed by the player's opponent (e.g., "Michael Bet $500"). The action screen may present information about the hand, such as the player's hole cards. The action screen may include a user interface element (e.g., a "Play The Hand" button) to enable the player to play the hand.

Figure 21D:
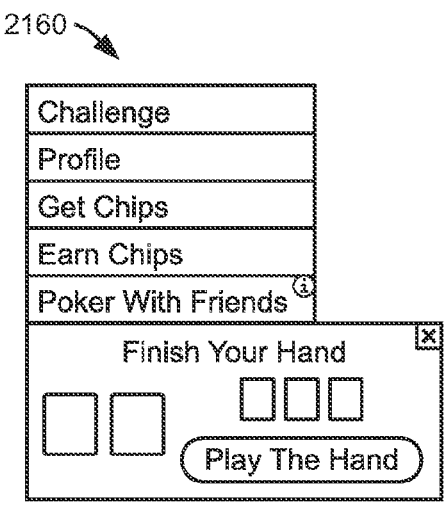
FIG. 21D is a screenshot illustrating an example menu interface in which a pop-up action screen appears.

FIG. 21D is a screenshot illustrating an example menu interface 2160 in which a pop-up action screen appears. The 1-On-1 Poker module 306 may present the action screen based on, for example, a player selecting a menu item corresponding to the 1-On-1 Poker game. The action screen may present information pertaining to the hand, such as the community cards and the player's hole cards. Additionally, the action screen may include user interface elements (not shown) that enable the player to perform an action (e.g., check, bet, raise, or fold). For example, the action screen may include user interface elements similar to those depicted in FIGS. 12A-12C or 16A.

Figure 21E:
FIG. 21E is a screenshot illustrating an example menu interface in which a pop-up result screen appears.

FIG. 21E is a screenshot illustrating an example menu interface 2170 in which a pop-up result screen appears. The 1-On-1 Poker module 306 may present the result screen based on, for example, a player selecting a menu item corresponding to the 1-On-1 Poker game. The result screen may present information about result of a hand of a game. For example, the result screen may present any of the information described above with respect to FIG. 16A or FIG. 16B. The result screen may also include a user interface element (e.g., a "Play Again" button) to enable the player to play another game.

Figure 21F:
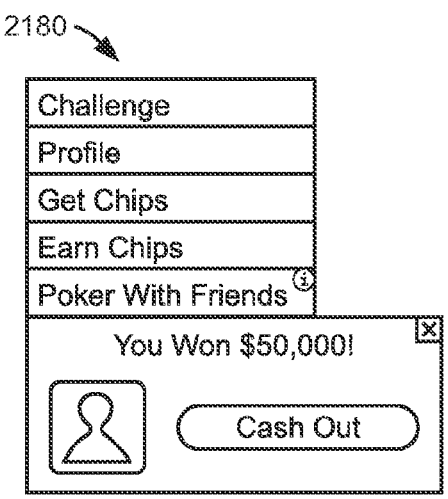
FIG. 21F is a screenshot illustrating an example menu interface in which a pop-up game over screen appears.

FIG. 21F is a screenshot illustrating an example menu interface 2180 in which a pop-up game over screen appears. The 1-On-1 Poker module 306 may present the game over screen based on, for example, a player selecting a menu item corresponding to the 1-On-1 Poker game. The game over screen may present information pertaining to the result of a game. For example, the game over screen may present information about the prize amount and the winner of the prize amount (e.g., "You Won $50,000!"). The game over screen may present any of the information discussed above with respect to FIG. 18A and FIG. 18B.

Figure 22A:
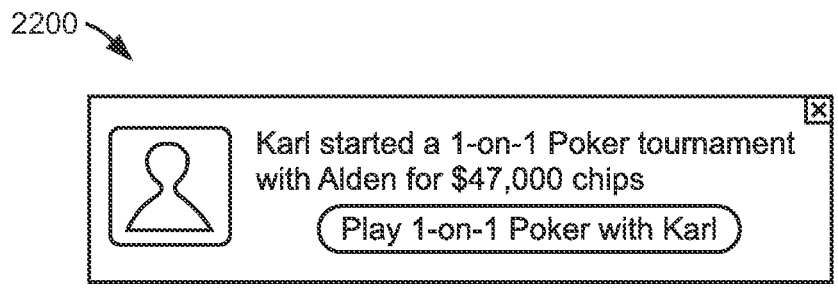
FIG. 22A is a screenshot illustrating an example news feed item.

FIG. 22A is a screenshot illustrating an example news feed item 2200. The 1-On-1 Poker module 306 may post the news feed item 2200 to a news feed. of the player (e.g., an in-game news feed or an out-of-game news feed, such as a Facebook news feed) based on actions of friends of the player with respect to the game networking system 120b. For example, when a friend of the player starts a 1-On-1 Poker tournament with another friend of the player, the 1-On-1 Poker module may post the news feed item 2200 to a Facebook news feed of the player. The news feed item 2200 may include information about the friends of the player who are engaged in a game, the type of the game, the amount of a wager associated with the game, etc. The news feed item 2200 may also include a user interface element (e.g., a "Play 1-on-1 Poker with Karl") button that enables the player to initiate a new game with a friend involved in the game that is the subject of the news feed item 2200.

Figure 22B:
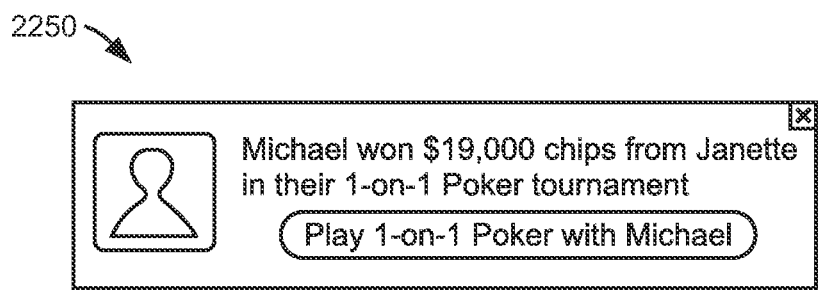
FIG. 22B is a screenshot illustrating an example news feed item.

FIG. 22B is a screenshot illustrating an example news feed item 2250. The 1-On-1 Poker module 306 may post the news feed item 2250 to a news feed of the player (e.g., an in-game news feed or an out-of-game news feed, such as a Facebook news feed) based on actions of friends of the player with respect to the game networking system 120b. For example, when a friend of the player wins a hand of a 1-On-1 Poker game against another friend of the player, the 1-On-1 Poker module may post the news feed item 2250 to an in-game news feed of the player. The news feed item 2250 may include information about the hand, such as the number of chips that a player won. The news feed item 2250 may also include a user interface element (e.g., a "Play 1-on-1 Poker with Michael") button that enables the player to initiate a new game with a friend involved in the game that is the subject of the news feed item 2250.

Figure 23:
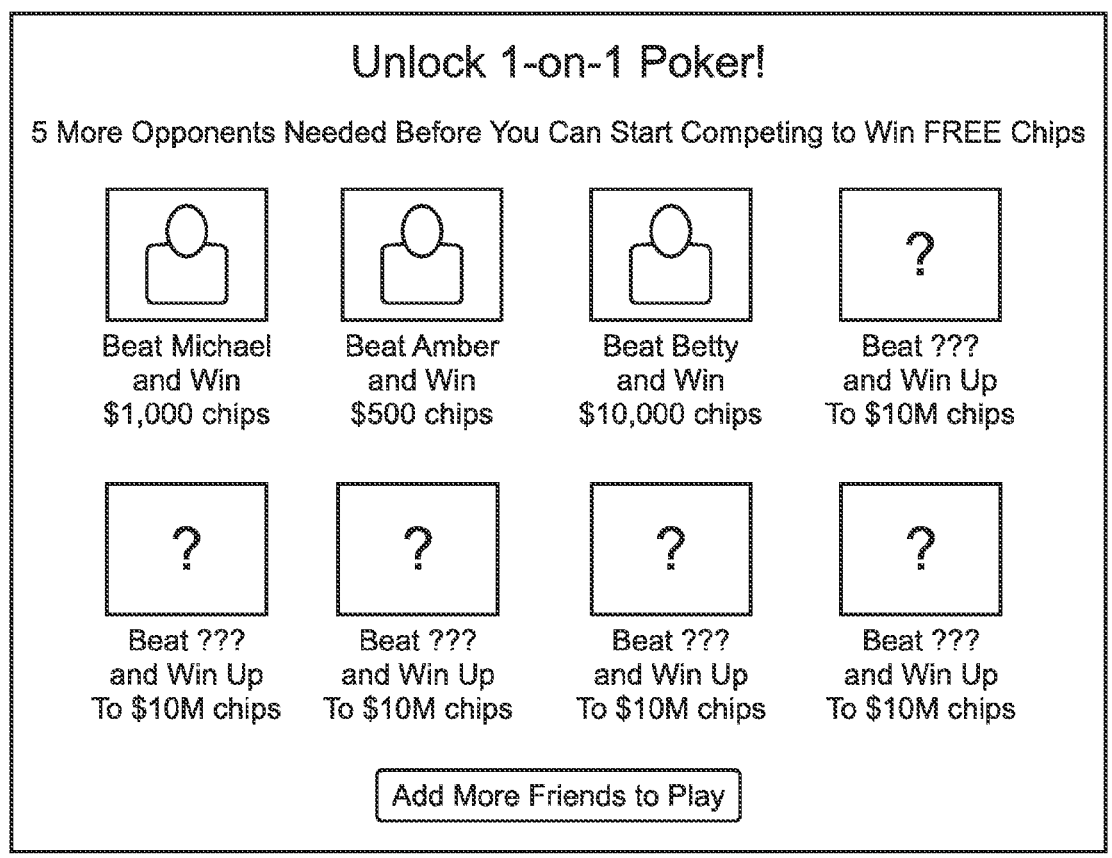
FIG. 23 is a screenshot illustrating an example embodiment of a user interface for an unlock screen.

FIG. 23 is a screenshot illustrating an example embodiment of a user interface for an unlock screen 2300. The 1-On-1 Poker module 306 may present the unlock screen 2300 based on, for example, a request by a player to unlock the 1-On-1 Poker game. The unlock screen 2300 may present information pertaining to tasks the player must perform within a primary game in order to unlock a game (e.g., "1-On-1 Poker") as a secondary game. For example, the unlock screen 2300 my include a listing of a number of opponents (e.g., "5") that the player needs in the primary game to unlock 1-On-1 . poker as a secondary game. The unlock screen 2300 may also include a listing of a number of opponents that the player already has with respect to the primary game. The listing of the number of opponents the player already has may include information pertaining to the opponents, such as their names and pictures. The listing may also include an incentive for beating the opponent, such as a number of chips offered as a prize.

The 1-On-1 Poker module 306 may calculate the number of chips to offer as a prize for the player beating a particular opponent based on various factors related to increasing the activity of the particular opponent or player, such as how often the particular opponent accesses the game networking system 120b. The unlock screen 2300 may include a representative listing of opponents the player does not yet have with respect to the primary game (e.g., blank squares with question marks inside). Each of the as-yet-to-be-determined opponents may also be associated with an incentive (e.g., poker chips) that the player may receive for adding friends as the opponents or beating the opponents. The 1-On-1 Poker module 306 may determine the prize based on various factors related to incentivizing the player to add more friends with respect to the game networking system 120b, such as the player's current number of poker chips or number of out-of-game friends. The unlock screen 2300 may include a user interface element (e.g., an "Add More Friends to Play" button) that enables the player to add. additional friends as potential opponents with respect to the game networking system 120b.

Figure 24:
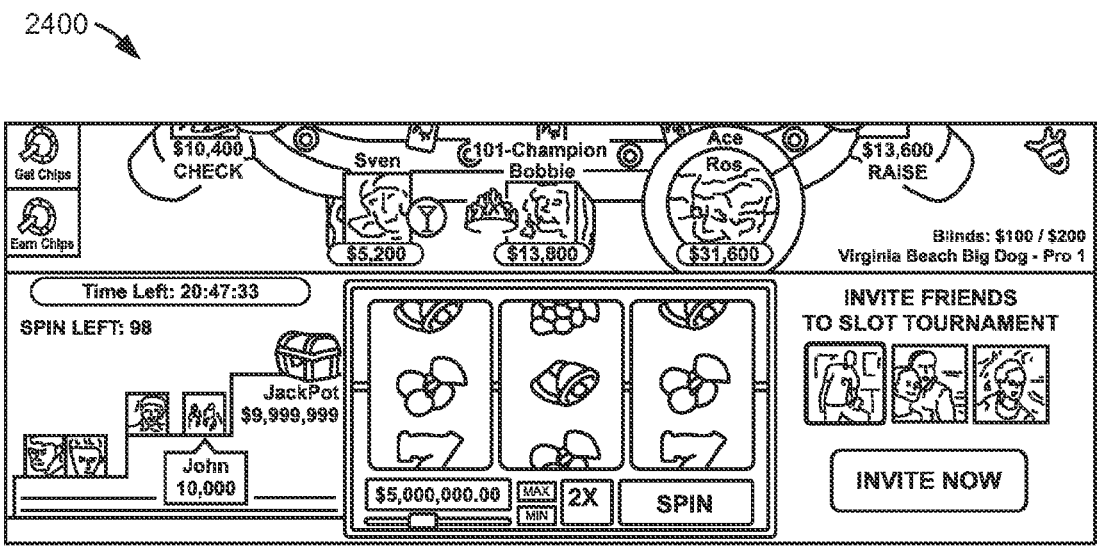
FIG. 24 is a screenshot illustrating an example embodiment of a user interface for a slot tournament game.

FIG. 24 is a screenshot illustrating an example embodiment of a user interface for a slot tournament game 2400. The slots module 308 may present the slot tournament game 2400 to a player on the game networking system 120b. For example, the slots module 308 may present the slot tournament game as a secondary game that the player can play whenever the player has downtime in a primary game Zynga Poker). Thus, the slots module 308 may present the game as a sidebar or other secondary view with respect to the primary game. As with other games, such as the 1-On-1 Poker game described above, the game combining module 302 may select the slot tournament game for combining with the primary game based on various factors, such as a level of interactivity of the slot tournament game in comparison to a level of activity of the primary game, interests of the player (e.g., whether the player prefers a slot game over other games, such as 1-On-1 Poker, Blackjack, or Pai Gow), and so on. Additionally, the game combining module 302 may control a flow of actions of the player with respect to the combined games such that, for example, when it is the player's turn to act in the (primary game, the game window for the primary game becomes active and the game window for the secondary game becomes inactive. Or, when the player has downtime with respect to the primary game, the game window for the primary game becomes inactive and the game window for the secondary game becomes active.

The user interface for the slot tournament game 2400 may enable a user to initiate a new game. For example, the user interface for the slot tournament game 2400 may prompt a player to provide a buy-in amount (like the buy-in amount discussed above with respect to the 1-On-1 Poker game). The user interface for the slot tournament game may also present a user interface (e.g., an "INVITE NOW" button) to enable the player to invite friends to play the slot tournament game 2400. The user interface may present information about potential opponents, such as their names or pictures. The slots module 308 may select a subset of potential opponents (e.g., 3) to highlight (e.g., for display near the user interface element for inviting friends). The slots module 308 may select the subset of potential opponents to highlight based on various factors, such as their activity levels with respect to the game networking system 120h, the strengths of their relationships with the player, their interests (e.g., things the friends express interest in (or "like") on social networking systems 120a), and so on.

The slots module 308 may set a predetermined length of time for the slot tournament game 2400 (e.g., based on a desired level of interactivity of the game with respect to a primary game or a determination of an optimal length of time for encouraging player retention). For example, the slots module 308 may set the slot tournament game 2400 to last for one week based on a determination (e.g., from historical data) that players are more likely to continue playing for one week than they are for longer periods of time. The slots module 308 may determine a winner of the slot tournament game 2400 based on the number of tournament chips that each player acquires before the end of the predetermined time period. The slots module 308 may present the time remaining in the user interface for the slot tournament game 2400. The user interface for the slot tournament game 2400 may include a user interface element a "SPIN" button) that enables the player to spin the reels. The user interface for the slot tournament game 2400 may also include an animation of the reels spinning. For each spin, the slot module 308 may line up the reels randomly. The slots module 308 may reward a player with tournament chips based on the reels for a particular spin lining up in any of one or more particular combinations.

The slots module 308 may determine that each player gets a limited number of slot pulls or energy during the tournament. The slots module 308 may reduce the slot pulls or energy for a player each time the player spins the reels of a virtual slot machine. The slots module 308 may present the number of pulls remaining (e.g., "SPIN LEFT: 98") or energy remaining in the user interface for the slot tournament game 2400. The slots module 308 may enable a player to receive additional pulls or energy in various ways. For example, the slots module 308 may enable the player to pay real money (e.g., U.S. dollars) to acquire additional pulls or energy. Or the slots module 308 may enable the player to wait for a period of time 1 hour) to acquire additional energy. Or the slots module 308 may provide additional pulls or energy to the player as an incentive for the player to perform other tasks (e.g., inviting additional friends to play the slot tournament game 2400 or asking friends for help with respect to a game the player is participating in on the game networking system 120b). For example, if a player asks a friend for help with respect to the slot tournament game 2400, the slot module 308 may automatically add the friend to the slot tournament game 2400 that the player is participating in.

The slots module 308 may provide prize multipliers to a player based on actions that the player performs, such as inviting friends to join the slot tournament 2400. For example, each time a friend invites a particular number of friends (e.g., 5) to play the slot tournament game, the slots module 308 may increase the player's prize multiplier by one. The slots module 308 may present the player's current prize multiplier (e.g., "2×") in the user interface for the slot tournament game 2400. For example, if a player's prize multiplier is 2, the player receives twice the tournament chips that the player would normally receive based on the reels lining up in a particular combination. The slots module 308 may prevent the player from using the tournament chips in an additional game, such as a primary game into which the slot tournament game 2400 is integrated.

The user interface for the slots tournament game 2400 may present the number of tournament chips that the player currently has. The slots module 308 may provide each player with a predetermined number of tournament chips (e.g., $5,000,000.00) when each player joins the game. The user interface for the slot tournament game 2400 may include user interface elements to enable the player to wager a particular number of tournament chips for each spin. For example, the user interface for the slot tournament game 2400 may include a slider control to enable player user to specify the wager. The user interface for the slot tournament game 2400 may also include user interface elements (e.g., "MAX" and "MIN" buttons) to enable the player to wager minimum or maximum amounts. The slots module 308 may determine the maximum or minimum wager amounts based on various factors, such as the number of tournament chips in play. The slots module 308 may determine the amount of the reward that a player receives when the reels line up in a particular combination based on the amount of tournament chips that the player wagered for the spin.

The slot module 308 may determine a jackpot amount to be allocated to one or more winners (e.g., the top 3 players) in the slots tournament. The jackpot may be a combined amount of virtual currency (e.g., a buy-in amount) that the players wagered upon joining the tournament. The buy-in amount may be separate from the number of tournament chips that is provided to each player. For example, the players may agree to buy-in for $10,000 in virtual currency, but each player may be awarded $5,000,000 in tournament chips. The slots module 308 may then calculate the jackpot as the number of players times the buy-in amount. The slot module 308 may determine the number of players who will receive a portion of the jackpot based on a percentage of total players who join the tournament. Additionally, the slot module 308 may determine a breakdown of the jackpot based on the position of the player in the standings (e.g., the first-place winner may receive 50% of the jackpot, the second-place winner may receive 30% of the jackpot, and the third-place player may receive 20% of the jackpot).

The user interface for the slot tournament game 2400 may present information related to a player's current opponents, such as their names, pictures, or current number of tournament chips.

addition to or instead of tournament chips, a player may receive abilities or additional rewards based on the way in which the reels of a. particular spin line up, For example, a particular reel combination may unlock an ability of a player to affect the performance of a friend within the slot tournament game 2400. For example, a player may unlock the ability to play pranks or tricks on a friend, reduce a friend's energy recharge rate, place a cap on the maximum amount a player may wager on a spin, or set back the friend within the game (e.g., reduce the friend's tournament chips). An example of a trick or a prank that a player may play on a friend include causing the player to think he has won a reward for a particular spin when, in fact, he has not (e.g., a playing of a fake win animation). Other examples may include causing the user interface for the slot tournament game 2400 to display false information to the friend, such as false values for any of the data presented to the friend via the user interface (e.g., time left, spins left, jackpot size, tournament chips of friends, and so on).

Figure 25:
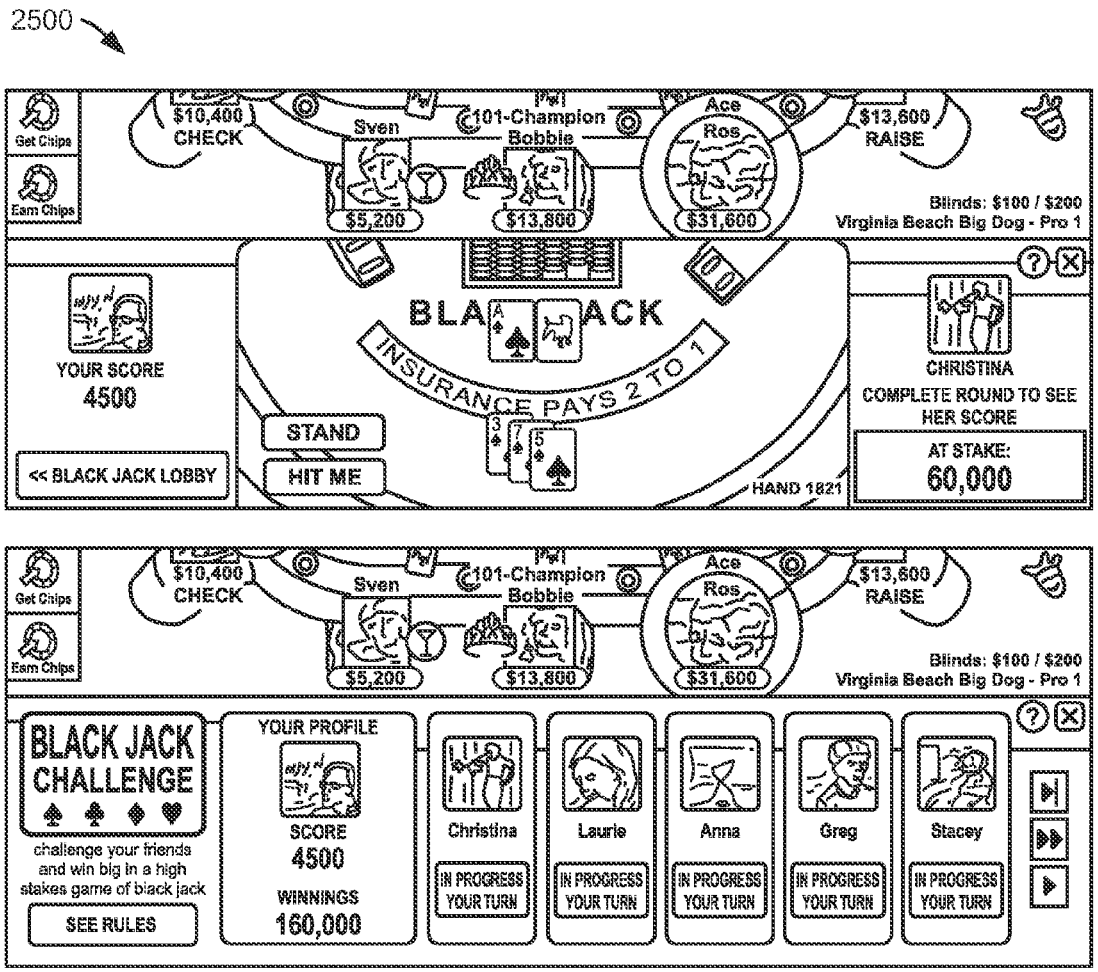
FIG. 25 is a screenshot illustrating an example embodiment of a user interface for a blackjack challenge game.

FIG. 25 is a screenshot illustrating an example embodiment of a user interface for a blackjack challenge game 2500. The blackjack module 310 may present the blackjack challenge game 2500 to a player on the game networking system 120b. For example, the blackjack module 310 may present the blackjack challenge game as a secondary game that the player can play whenever the player has downtime in a primary game (e.g., Zynga Poker). Thus, the blackjack module 310 may present the game as a sidebar or other secondary view with respect to the primary game. As with other games, such as the 1-On-1 Poker game described above, the game combining module 302 may select the blackjack challenge game 2500 for combining a the primary game based on various factors, such as a level of interactivity of the Blackjack challenge game 2500 in comparison to a level of activity of the primary game, interests of the player (e.g., whether the player prefers Blackjack over other games, such as 1-On-1 Poker, Pai Gow, or slots, and so on.

In various embodiments, the blackjack challenge game 2500 may enable a player to play a particular number of hands (e.g., 10) against a robot dealer. The player initiating the game may specify the number of hands or the blackjack module 310 may determine the number of hands. The blackjack module 310 may determine the number of hands based on various factors, such as historical information pertaining to player retention. For example, the blackjack module 310 may determine that the number of hands will be 20 based on a determination that a greater number of hands is less likely to increase the activity levels of the players with respect to the game networking system 1201). As with the other games described above (e.g., the 1-On-1 Poker game), the player initiating the game (the challenger) may specify a buy-in amount (e.g., in virtual currency) and the challengee may accept the buy-in amount proposed by the challenger or agree to play the game for a lesser buy-in amount. The buy-in amount may be with respect virtual currency owned by each player with respect to the game networking system 120b. Thus, the virtual currency of the buy-in amount may be separate from the tournament chips provided to each player to play the blackjack challenge game 2500. Additionally, the blackjack challenge game 2500 may have a time limit (e.g., 24 hours). Upon expiration of the time limit, the game may end.

The blackjack module 310 may determine the winner of the blackjack challenge game 2500 based on a comparison of the total number of tournament chips (or score) that each player has after playing the particular number of hands. The blackjack module 310 may deal the cards to each player from a deck that is shuffled the same for each player, thereby eliminating some of the luck involved in the game (e.g., users can't claim to have won nor lost based on the shuffle).

The user interface for the blackjack challenge game 2500 may enable a player to place a wager on a hand (e.g., prior to the dealing of the cards for the hand) using his tournament chips. In various embodiments, the player may place a bet on each hand. In other embodiments, the player may place an upfront bet and distribute it over a set of blackjack hands before the set of blackjack hands are dealt, The blackjack module 310 may depict the dealing of cards to the player or the dealer (e.g., via an animation sequence). The blackjack module 310 may present information pertaining to the player's hole cards and the dealer's hole cards via the user interface for the blackjack challenge game 2500. In various embodiments, the user interface for the blackjack challenge game 2500 may display one or both of the dealer's hole cards prior to the player performing any action (e.g., hitting or standing). In other embodiments, both of the dealer's hole cards may be hidden until the player completes his turn.

The user interface for the blackjack challenge game 2500 may include user interface elements (e.g., "HIT ME" or "STAND" buttons) that enable the player to perform actions such as requesting another card or standing pat. Other actions may include splitting or doubling down. The user interface for the blackjack challenge game 2500 may present information concerning the number of hands that have been dealt or the number of hands that are to be played by the player to complete the game or a round of the game (e.g., "18/21"). The user interface for the blackjack game 2500 may also present information concerning an amount of time remaining for the completion of the game, if a time limit has been set. The user interface for the blackjack challenge game 2500 may present information pertaining to the amount of virtual currency at stake (e.g., "60,000," which may be the sum of the buy-in amounts paid by each of the players of the game). The user interface for the blackjack challenge game 2500 may present information pertaining to the user's current score (e.g., "4500") or tournament chips.

The blackjack module 310 may enable the user to unlock the presentation of additional information via the user interface for the blackjack challenge game 2500. For example, the blackjack module 310 may unlock an ability for a player to see a score of one of his opponents by completing a round of the game. The blackjack module 310 may notify the user of the ability to unlock the additional information via the user interface for the blackjack challenge game 2500 (e.g., by displaying information about the opponent, such as a picture or name of the opponent, and a message that states "COMPLETE ROUND TO SEE HER SCORE.")

The user interface for the blackjack challenge game 2500 may include a lobby that is similar to a lobby for the 1-On-1 Poker game that is described above with respect to 10A-10C. For example, the lobby for the blackjack challenge game 2500 may present information about a player's current, past, or potential opponents. For example, the lobby my present names and pictures of current opponents, along with information pertaining to an ongoing game between the player and the opponent (e.g., "IN PROGRESS," "YOUR TURN," or "HER TURN.") Or, for a potential new opponent, the lobby may present a player with an option to invite the potential new opponent to play the game (e.g., a "SEND INVITE" button). The blackjack module 310 may select potential new opponents for a player (e.g., based on any of the criteria discussed above with respect to FIGS. 10A-10C). The lobby may present information pertaining to a player's score within a game or the player's winnings (e.g., of buy-in amounts).

Figure 26:
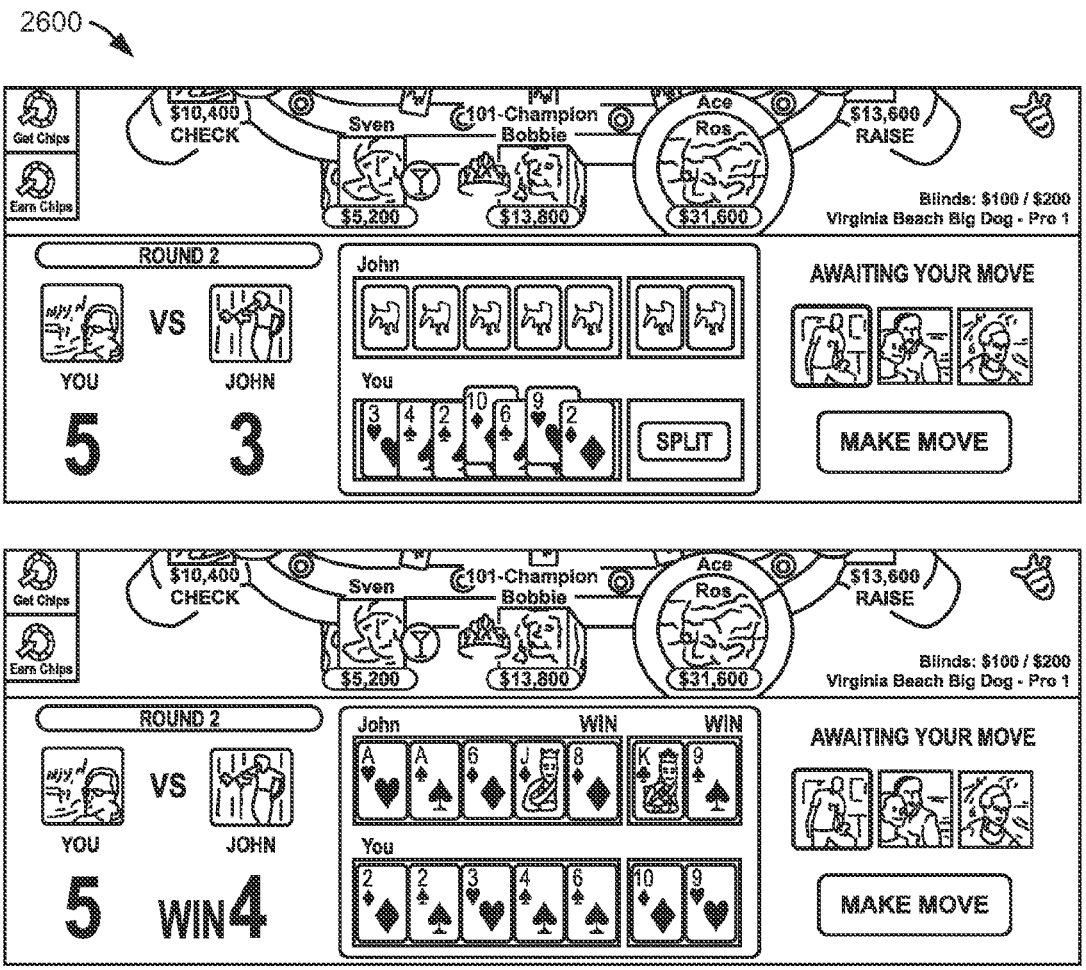
FIG. 26 is a screenshot illustrating an example embodiment of a user interface for a Pai Gow poker game.
Figure 27:
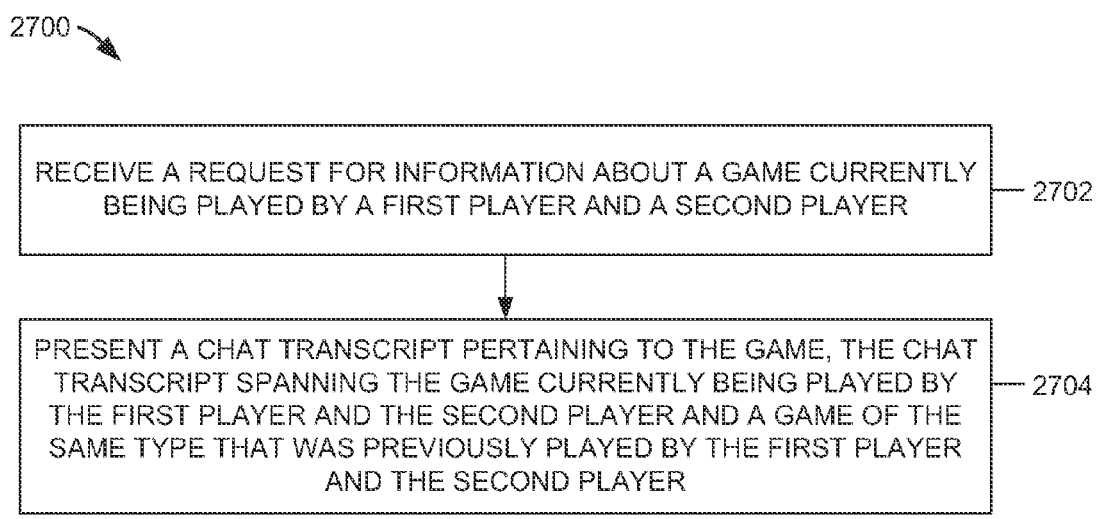
FIG. 27 is a flowchart of an example embodiment of a method of implementing an in-game cross-session chat between players.

FIG. 26 is a screenshot illustrating an example embodiment of a user interface for a Pai Gow poker game 2600. The Pai Gow module 312 may present the Pai Gow poker game 2600 to a player on the game networking system 120b. For example, the Pai Gow module 312 may present the Pai Gow poker game 2600 as a secondary game that the player can play whenever the player has downtime in a primary game (e.g., Zynga Poker). Thus, the Pai Gow module 312 may present the Pai Gow game 2600 as a sidebar or other secondary view with respect to the primary game. As with other games, such as the 1-On-1 Poker game described above, the game combining module 302 may select the Pai Gow poker game 2600 for combining with a primary game based on various factors, such as a level of interactivity of the Pai Gow poker game 2600 in comparison to a level of activity of the primary game, interests of the player (e.g., whether the player prefers Pai Gow over other games, such as 1-On-1 Poker, Blackjack, or slots), and so on.

The Pai Gow module 312 may implement the Pai Gow game 2600 as a variant of the 1-On-1 Poker game described above. For example, the user interface for the Pai Gow poker game 2600 may include adapted forms of the screens described above with respect to the 1-On-1 Poker game such that they are applicable to a Pai Gow-style poker game instead of a Texas-Hold'Em-style poker game. As with the 1-On-1 poker game, a player may challenge an opponent to a Pai Gow game via a lobby screen. The user interface for the Pai Gow game 2600 may include an action screen that includes a user interface element (e.g., a "SPLIT" button) that enables a player to structure a Pai Gow hand (e.g., create a five-card poker hand and a two-card poker hand from seven cards dealt to the player). The user interface may enable to the player to structure multiple Pai Gow hands as part of the initiation of the challenge.

The challengee may accept the challenge and wager a buy-in amount that is equal to or less than the buy-in amount proposed by the challenger. The Pai Gow module 312 may present the challengee with an action screen for structuring one more Pai Gow hands (e.g., corresponding to the Pai Gow hands structured by the challenger as part of the challenge). Upon structuring a hand by the challengee in response to a hand structured by the challenger, the user interface for the Pai Gow game 2600 may present a result of the hand. For example, the user interface for the Pai Gow poker game 2600 may reveal a hand structured by the challengee and a corresponding hand structured by the challenger, The user interface for the Pai Gow poker game 2600 may highlight the winning five-card hand and the winning two-card hand. If a player wins both the five-card hand and the two-card hand, the user interface for the Pai Gow poker game 2600 may highlight the player as the winner of the hand (e.g., by updating the standings for a round to increase the number of wins for the player by 1).

The Pai Gow module 2600 may specify a round as including a particular number of hands (e.g., 11). The user interface for the Pai Gow game 2600 may present information identifying the current round (e.g., "ROUND 2") or standings within the round (e.g., the number of hands won by the challenger and the number of hands won by the challengee), The Pai Gow module 2600 may also specify a game as including a particular number of rounds. Upon the completion of all of the rounds, the Pai Gow module 2600 may award. the prize pool to the winner of the game. The Pai Gow module 2600 may determine the number of hands per round and the number of rounds per game based on various factors. For example, the Pai Gow module 2600 may determine the number of hands or number of rounds based on historical data in order to maximize activity levels of players with respect to the game networking system 120*b*, Or the Pai Gow module 2600 may determine the number of hands or number of rounds based on input from a player (e.g., a challenger).

The user interface for the Pai Gow poker game 2600 may include a user interface element (e.g., a "MAKE MOVE" button) that enables a player to move onto a next hand (e.g., in the same game or in a different game) after performing an action to complete a hand.

Game Interfaces

In various embodiments, a user 101 of a client system 2930 can use a browser client (e.g., Firefox, Chrome, Internet Explorer, etc.) to access the online game over the Internet (or other suitable network). For example, the game interface 1200 illustrated in FIG. 12A may be automatically generated and presented to the user in response to the user visiting or accessing the game operator's website or a third-party's website from client system 130 with a browser client, Game networking system 120*b* can transmit data to client system 130, thereby allowing it to display game interface 1200, which is typically some type of graphic user interface. For example, the webpage downloaded to client system 130 may include an embedded call that causes client system 130 to download an executable object, such as a Flash .SWF object, which executes on client system 130 and renders the game within the context of the webpage. Other interface types are possible, such as server-side rendering and the like. Game interface 1200 is configured to receive signals from the user 101 via client system 130. For example, the user 101 can click on game interface 1200 or enter commands from a keyboard or other suitable input device. The game engine can respond to these signals to allow game play. The display of game interface 1200 can change based on the output of the game engine, the input of the player, and other signals from game networking system 120*b* and client system 130.

The game interface 1200 can display various game components, such as the game environment, options available to the player (e.g., in-game actions, preferences, settings, etc.), game results, and so forth. Some components of the game interface may be static, while others may be dynamic (e.g., changing with game play). The user may be able to interact with some components (e.g., player character, NPCs, virtual objects, etc.) and not interact with other components (e.g., the background of the virtual world, such as the virtual street or sidewalk). The user can engage in specific in-game actions or activities by providing input to game interface 1200.

The user can also click on various user interface elements in game interface 1200 to activate various game options. For example, if the user clicks on one of the buttons in action bar 1200 to call, fold, or raise, the game engine will alter the game interface 1200 to show the result of the action. For example, the player could click on the All-in button and the Raise button, causing the game engine to alter the game interface 1200 to show all of the player's chips moving toward the center of the table.

One skilled in the art would appreciate that FIG. 12A is presented merely as an example of an embodiment of one type of online game and that the present disclosure is intended to encompass a variety of game types, including gambling games, rote-playing games, puzzle games, and the like.

Data Flow

Figure 28:
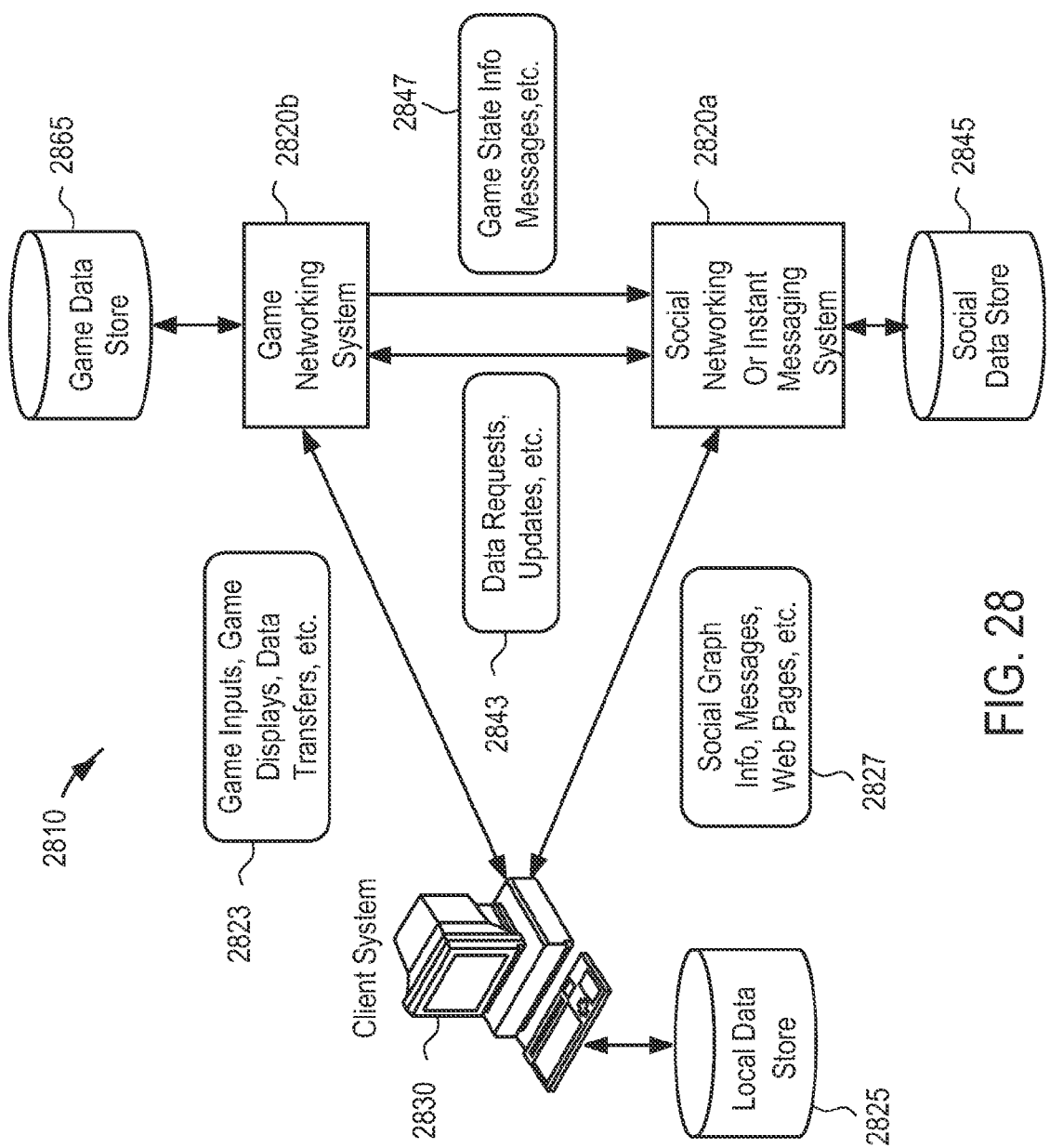
FIG. 28 is a block diagram illustrating an example data flow between the components of system.

FIG. 28 is a block diagram illustrating an example data flow between the components of system 2810, In particular embodiments, system 2810 can include client system 2830, social networking system 2820*a*, and game networking system 2820*b*, The components of system 2810 can be connected to each other in any suitable configuration, using any suitable type of connection. The components may be connected directly or over any suitable network. Client system 2830, social networking system 2820*a*, and game networking system 28201) can each have one or more corresponding data stores such as local data store 2825, social data store 2845, and game data store 2865, respectively. Social networking system 2820*a* and game networking system 2820*b* can also have one or more servers that can communicate with client system 2830 over an appropriate network. Social networking system 2820*a* and game networking system 2820*b* can have, for example, one or more internet servers for communicating with client system 2830 via the Internet. Similarly, social networking system 2820*a* and game networking system 2820*b* can have one or more mobile servers for communicating with client system 2830 via a mobile network (e.g., GSM, PCS, Wi-Fi, WPAN, etc.). In some embodiments, one server may be able to communicate with client system 2830 over both the Internet and a mobile network. in other embodiments, separate servers can be used.

Client system 2830 can receive and transmit data 2823 to and from game networking system 2820*b*. This data can include, for example, webpages, messages, game inputs, game displays, HTTP packets, data requests, transaction information, updates, and other suitable data. At some other time, or at the same time, game networking system 2820*b* can communicate data 2843, 2847 (e.g., game state information, game system account information, page info, messages, data requests, updates, etc.) with other networking systems, such as social networking system 2820*a* (e.g., Facebook, Myspace, etc.). Client system 2830 can also receive and transmit data 527 to and from social networking system 2820*a*. This data can include, for example, webpages, messages, social graph information, social network displays, HTTP packets, data requests, transaction information, updates, and other suitable data.

Communication between client system 2830, social networking system 2820*a*, and game networking system 2820*b* can occur over any appropriate electronic communication medium or network using any suitable communications protocols. For example, client system 2830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HTML documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 2820*b*, the BLOB containing the game state for the instance corresponding to the player can be transmitted to client system 2830 for use by a client-side executed object to process. In particular embodiments, the client-side executable may be a Flash-based game, which can de-serialize the game state data in the BLOB. As a player plays the game, the game logic implemented at client system 2830 maintains and modifies the various game state parameters locally. The client-side game logic may also batch game events, such as mouse clicks, and transmit these events to game networking system 2820*b*. Game networking system 2820*b* may itself operate by retrieving a copy of the BLOB from a database or an intermediate memory cache (memcache) layer. Game networking system 2820*b* can also deserialize the BLOB to resolve the game state parameters and execute its own. game logic based on the events in the batch file of events transmitted by the client to synchronize the game state on the server side. Game networking system 2820*b* may then re-serialize the game state, now modified, into a BLOB and pass this to a memory cache layer for lazy updates to a persistent database.

With a client-server environment in which the online games may run, one server system, such as game networking system 2820*b*, may support multiple client systems 2830. At any given time, there may be multiple players at multiple client systems 2830 all playing the same online game. In practice, the number of players playing the same game at the same time may be very large. As the game progresses with each player, multiple players may provide different inputs to the online game at their respective client systems 2830, and multiple client systems 2830 may transmit multiple player inputs and/or game events to game networking system 2820*b* for further processing. In addition, multiple client systems 2830 may transmit other types of application data to game networking system 2820*b*.

In particular embodiments, a computed-implemented game may be a text-based or turn-based game implemented as a series of web pages that are generated after a player selects one or more actions to perform. The web pages may be displayed in a browser client executed on client system 2830. As an example and not by way of limitation, a client application downloaded to client system 2830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 2820*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time, When an update to an application datum occurs at client system 2830, either caused by an action of a game player or by the game logic itself, client system 2830 may need to inform game networking system 2820*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 2810 is discussed in reference to updating a multi-player online game hosted on a network-addressable system (such as, for example, social networking system 2820*a* or game networking system 2820*b*), where an instance of the online game is executed remotely on a client system 2830, which then transmits application event data to the hosting system such that the remote game server synchronizes the game state associated with the instance executed by the client system 2830.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 2830 may include a Flash client. The Flash client may be configured to receive and run Flash applications or game object codes from any suitable networking system (such as, for example, social networking system 520*a* or game networking system 2820*b*). In particular embodiments, the Flash client may be run in a browser client executed on client system 2830. A player can interact with Flash objects using client system 2830 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client. system 2830, the Flash client may send the events that caused the game state changes to the in-game object to game networking system 2820b. However, to expedite the processing and hence the speed of the overall gaming experience, the Flash client may collect a batch of some number of events or updates into a batch file. The number of events or updates may be determined by the Flash client dynamically or determined by game networking system 2820b based on server toads or other factors. For example, client system 2830 may send a batch file to game networking system 2820b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 2830. In particular embodiments, the batch file may be a text file and the name-value pairs may be in string format.

In particular embodiments, when a player plays an online game on client system 2830, game networking system 2820b may serialize all the game-related data, including, for example and without limitation, game states, game events, and user inputs, for this particular user and this particular game into a BLOB and stores the BLOB in a database. The BLOB may be associated with an identifier that indicates that the BLOB contains the serialized game-related data for a particular player and a particular online game. It particular embodiments, while a player is not playing the online game, the corresponding BLOB may be stored in the database. This enables a player to stop playing the game at any time without losing the current state of the game the player is in. When a player resumes playing the game next time, game networking system 2820b may retrieve the corresponding BLOB from the database to determine the most-recent values of the game-related data. in particular embodiments, while a player is playing the online game, game networking system 2820b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity such as a business or third party application).

Figure 29:
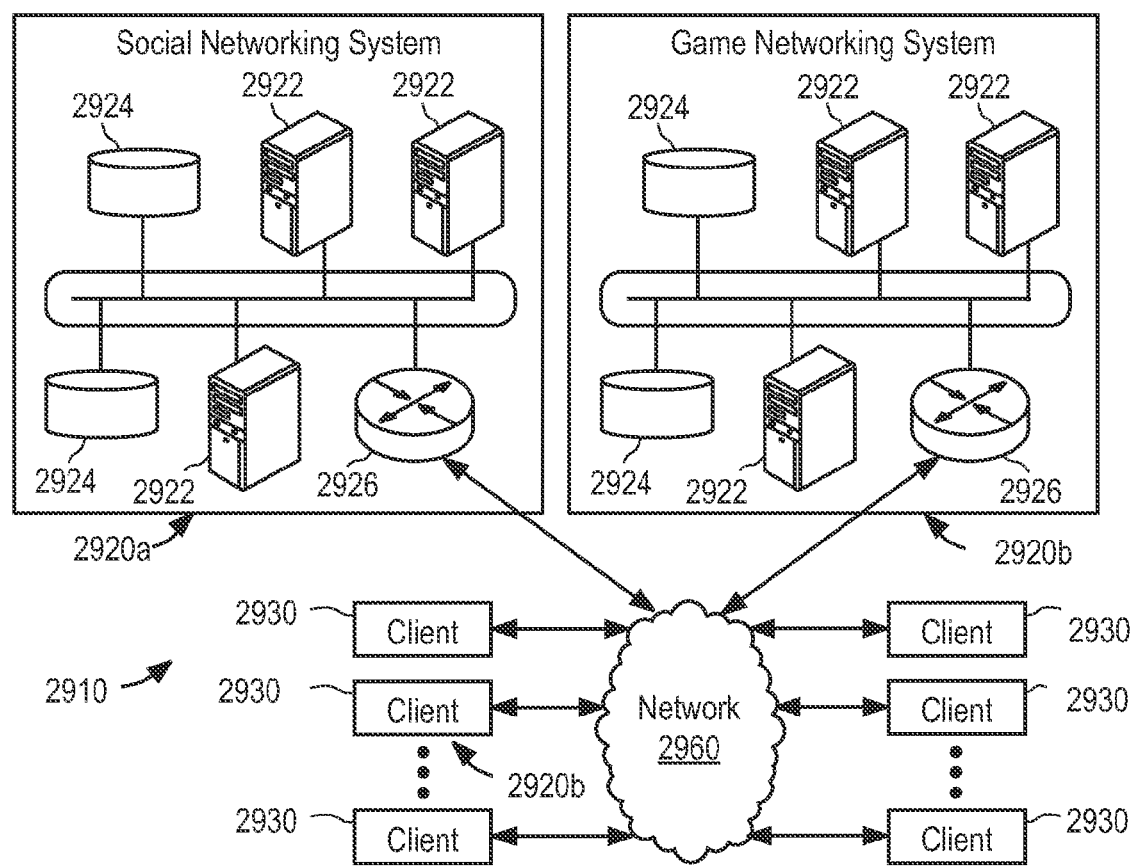
FIG. 29 is a Hock diagram illustrating an example network environment, in which various example embodiments may operate.

Particular embodiments may operate in a wide area network environment, such as the Internet, including multiple network addressable systems. FIG. 29 is a block diagram illustrating an example network environment 2910, in which various example embodiments may operate. Network cloud 2960 generally represent one or more interconnected networks, over which the systems and hosts described herein can communicate. Network cloud 2960 may include packet-based WANs (such as the Internet), private networks, wireless networks, satellite networks, cellular networks, paging networks, and the like. As FIG. 29 illustrates, particular embodiments may operate in a network environment comprising one or more networking systems, such as social networking system 2920a, game networking system 2920b, and one or more client systems 2930. The components of social networking system 2920a and game networking system 2920b operate analogously; as such, hereinafter they may be referred to simply as networking system 2920. Client systems 2930 are operably connected to the network environment via a network service provider, a wireless carrier, or any other suitable means.

Networking system 2920 is a network addressable system that, in various example embodiments, comprises one or more physical servers 2922 and data stores 2924. The one or more physical servers 2922 are operably connected to computer network 2960 via, by way of example, a set of routers and/or networking switches 2926, In an example embodiment, the functionality hosted by the one or more physical servers 2922 may include web or HTTP servers, FTP servers, application servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 2922 may host functionality directed to the operations of networking system 2920. Hereinafter servers 2922 may be referred to as server 2922, although server 2922 may include numerous servers hosting, for example, networking system 2920, as well as other content distribution servers, data stores, and databases. Data store 2924 may store content and data relating to, and enabling, operation of networking system 2920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 2924 corresponds to one or more of a. variety of separate and integrated databases, such as relational databases and object-oriented databases, that maintain information as an integrated collection of logically related records or files stored on one or more physical systems. Structurally, data store 2924 may generally include one or more of a large class of data storage and management systems. in particular embodiments, data store 2924 may be implemented by any suitable physical system(s) including components, such as one or more database servers, mass storage media, media library systems, storage area networks, data storage clouds, and the like. In one example embodiment, data store 2924 includes one or more servers, databases (e.g., MySQL), and/or data warehouses. Data store 2924 may include data associated with different networking system 2920 users and/or client systems 2930.

Client system 2930 is generally a computer or computing device including functionality for communicating (e.g., remotely) over a computer network. Client system 2930 may be a desktop computer, laptop computer, personal digital assistant (PDA), in or out-of-car navigation system, smart phone or other cellular or mobile phone, or mobile gaming device, among other suitable computing devices. Client system 2930 may execute one or more client applications, such as a web browser e.g., Microsoft Internet Explorer, Mozilla Firefox, Apple Safari, Google Chrome, and Opera), to access and view content over a computer network. In particular embodiments, the client applications allow a user of client system 2930 to enter addresses of specific network resources to be retrieved, such as resources hosted by networking system 2920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the U of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 2930 desires to view a particular webpage (hereinafter also referred to as a target structured document) hosted by networking system 2920, the user's web browser, or other document rendering engine or suitable client application, formulates and transmits a request to networking system 2920. The request generally includes a URL or other document identifier as well as metadata or other information. By way of example, the request may include information identifying the user, such as a user identifier OM as well as information identifying or characterizing the web browser or operating system running on the user's client computing device 2930. The request may also include location information identifying a geographic location of the user's client system or a logical network location of the user's client system. The request may also include a timestamp identifying when the request was transmitted.

Although the example network environment 2910 described above and. illustrated in FIG. 29 described with respect to social networking system 2920a and game networking system 2920b, this disclosure encompasses any suitable network environment using any suitable systems. As an example and not by way of limitation, the network environment may include online media systems, online reviewing systems, online search engines, online advertising systems, or any combination of two or more such systems.

Figure 30:
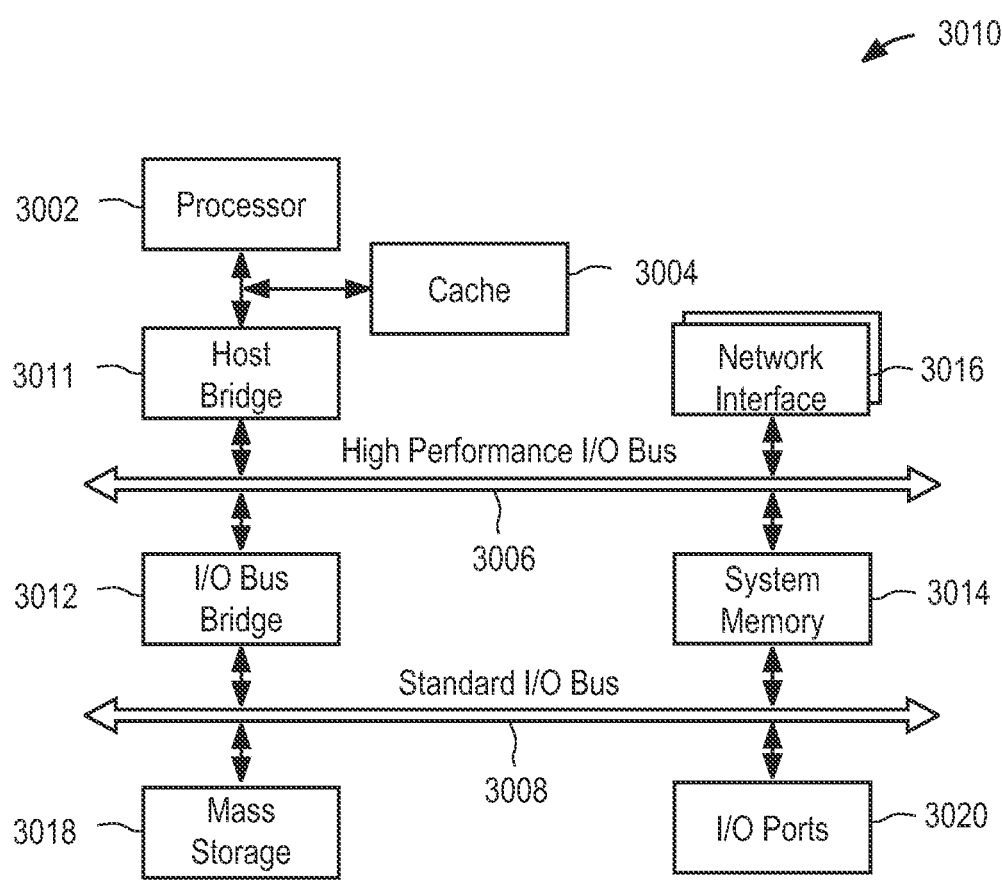
FIG. 30 is a block diagram illustrating an example computing system architecture, which may be used to implement a server or a client system. In one embodiment, hardware system comprises a processor, a cache memory, and one or more executable modules and drivers, stored on a tangible computer readable medium, directed to the functions described herein.

FIG. 30 is a block diagram illustrating an example computing system architecture, which may be used to implement a server 2922 or a client system 2930. in one embodiment, hardware system 3010 comprises a processor 3002, a cache memory 3004, and one or more executable modules and drivers, stored on a tangible computer readable medium, directed to the functions described herein. Additionally, hardware system 3010 may include a high performance input/output (I/O) bus 3006 and a standard I/O bus 3008. A host bridge 3011 may couple processor 3002 to high performance I/O bus 706, whereas I/O bus bridge 3012 couples the two buses 3006 and 3008 to each other. A system memory 3014 and one or more network/communication interfaces 3016 may couple to bus 3006. Hardware system 3010 may further include video memory (not shown) and a display device coupled to the video memory. Mass storage 3018 and I/O ports 3020 may couple to bus 3008. Hardware system 3010 may optionally include a keyboard, a pointing device, and a display device (not shown) coupled to bus 3008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), of Sunnyvale, Calif., as well as any other suitable processor.

The elements of hardware system 3010 are described in greater detail below. In particular, network interface 3016 provides communication between hardware system 3010 and any of a wide range of networks, such as an Ethernet (e.g., IEEE 802.3) network, a backplane, and so forth. Mass storage 3018 provides permanent storage for the data and programming instructions to perform the above-described functions implemented in servers 2922, whereas system memory 3014 DRAM) provides temporary storage for the data and programming instructions when executed by processor 3002. I/O ports 3020 are one or more serial and/or parallel communication ports that provide communication between additional peripheral devices, which may be coupled to hardware system 3010.

Hardware system 3010 may include a variety of system architectures and various components of hardware system 3010 may be rearranged. For example, cache 3004 may be on-chip with processor 3002. Alternatively, cache 3004 and processor 3002 may be packed together as a "processor module," with processor 3002 being referred to as the "processor core." Furthermore, certain embodiments of the present disclosure may not require nor include all of the above components. For example, the peripheral devices shown coupled to standard I/O bus 3008 may couple to high performance I/O bus 3006. In addition, in some embodiments, only a single bus may exist, with the components of hardware system 3010 being coupled to the single bus. Furthermore, hardware system 3010 may include additional components, such as additional processors, storage devices, or memories.

An operating system manages and controls the operation of hardware system 3010, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device cellular phone, smart phone, personal GPS, PDA, personal gaming device, etc.), that makes API calls directly to a server. Still further, white the embodiments described above operate with respect to a poker game, the embodiments can be applied to any game that includes multiple players. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

The invention claimed is:

1. A computer-implemented method comprising:
receiving a request for information about an online game currently being played by a first player and a second player, the online game being played according to a set of rules and a strategy;
determining, with one or more processors, a previous online game that was previously played by the first player and the second player; and
generating a chat transcript pertaining to the online game in response to the request for the information, the chat transcript spanning from the online game currently being played by the first player and the second player to the previous online game that was previously played by the first player and the second player, the chat transcript comprising messages entered automatically on behalf of the first player and the second player and messages entered manually by the first player and the second player.

2. The computer-implemented method of claim 1, wherein the previous online game that was previously played by the first player and the second player is of the same type as the online game currently being played by the first player and the second player.

3. The computer-implemented method of claim 1, wherein that chat transcript comprises a header that provides a context of messages included in the chat transcript after the header.

4. The computer-implemented method of claim 3, wherein the header comprises information pertaining to a stage of the game.

5. The computer-implemented method of claim 4, wherein the online game is a card game and the information includes a hand of the card game.

6. The method of claim 1, wherein the previous online game is a modified version of the online game currently being played.

7. A system comprising:
a processor-implemented messaging module configured to:
receive a request for information about an online game currently being played by a first player and a second player, the online game being played according to a set of rules and a strategy;
determine a previous online game that was previously played by the first player and the second player; and
generate a chat transcript pertaining to the online game in response to the request for the information, the chat transcript spanning from the online game currently being played by the first player and the second player to the previous online game that was previously played by the first player and the second player, the chat transcript comprising messages entered automatically on behalf of the first player and the second player and messages entered manually by the first player and the second player.

8. The system of claim 7, wherein the online game that was previously played by the first player and the second player is of the same type as the game currently being played by the first player and the second player.

9. The system of claim 7, wherein the chat transcript comprises a header that provides a context of messages included in the chat transcript after the header.

10. The system of claim 9, wherein the header includes information pertaining to a stage of the online game.

11. The system of claim 10, wherein the online game is a card game and the information includes a hand of the card game.

12. The system of claim 10, wherein the online game includes a posting of a blind and the information includes an amount of the blind.

13. A non-transitory machine readable storage medium storing a set of instructions that, when executed by at least one processor, causes the at least one processor to perform operations, the operations comprising:
   receiving a request for information about an online game currently being played by a first player and a second player, the online game being played according to a set of rules and a strategy;
   determining a previous online game that was previously played by the first player and the second player; and
   generating a chat transcript pertaining to the online game in response to the request for the information, the chat transcript spanning from the online game currently being played by the first player and the second player to the previous online game that was previously played by the first player and the second player, the chat transcript comprising messages entered automatically on behalf of the first player and the second player and messages entered manually by the first player and the second player.

14. The non-transitory machine readable storage medium of claim 13, wherein the previous online game that was previously played by the first player and the second player is of the same type as the online game currently being played by the first player and the second player.

15. The non-transitory machine readable storage medium of claim 13, wherein that chat transcript comprises a header that provides a context of messages included in the chat transcript after the header.

16. The non-transitory machine readable storage medium of claim 15, wherein the header comprises information pertaining to a stage of the online game.

17. The non-transitory machine readable storage medium of claim 16 wherein the online game includes a posting of a blind and the information includes an amount of the blind.

\* \* \* \* \*

UNITED STATES PATENT AND TRADEMARK OFFICE
CERTIFICATE OF CORRECTION

| | | |
|---|---|---|
| PATENT NO. | : 8,545,330 B2 | Page 1 of 8 |
| APPLICATION NO. | : 13/244915 | |
| DATED | : October 1, 2013 | |
| INVENTOR(S) | : Wickett et al. | |

It is certified that error appears in the above-identified patent and that said Letters Patent is hereby corrected as shown below:

In the Specification

In column 1, line 8, delete "61/512,804." and insert --61/512,804,--, therefor

In column 1, line 10, delete "INTER ACTIVITY" and insert --INTERACTIVITY--, therefor In column 1, line 43, delete "in game" and insert --in-game--, therefor In column 2, line 35, delete "5" and insert --8--, therefor In column 2, line 39, delete "white" and insert --while--, therefor In column 3, line 53, delete "Hock" and insert --block--, therefor In column 4, line 14, delete "(previous" and insert --previous--, therefor In column 4, line 37, before "extranet,", insert --an--, therefor In column 4, line 39, before "metropolitan", insert --a--, therefor In column 4, line 66, after "like.", insert
--Although FIG. 1 illustrates a particular number of players 101, social--, therefor In column 5, line 26, before "VPN,", insert --a--, therefor In column 5, line 30, delete "connections," and insert --connections.--, therefor In column 5, line 41, delete "120a." and insert --120a--, therefor In column 5, line 45, delete "online," and insert --online--, therefor In column 5, line 52, delete "objects," and insert --objects.--, therefor In column 6, line 21, delete "and." and insert --and--, therefor Signed and Sealed this
Eleventh Day of November, 2014

Michelle K. Lee
*Deputy Director of the United States Patent and Trademark Office*

CERTIFICATE OF CORRECTION (continued)
U.S. Pat. No. 8,545,330 B2

In column 6, line 22, delete "data." and insert --data--, therefor

In column 6, line 38, before "offline)", insert --(i.e.,--, therefor

In column 6, line 39-40, delete "character," and insert --character.--, therefor In column 6, line 50, delete "watt" and insert --wall--, therefor In column 7, line 34, delete "u" and insert --a--, therefor In column 8, line 13, delete "users. character" and insert --users.
The minimum number of edges required to connect a player (or player character)--, therefor In column 8, line 21, delete "player," and insert --player.--, therefor In column 8, line 24, delete "separation," and insert --separation.--, therefor In column 9, line 23, delete "FIG," and insert --FIG.--, therefor In column 9, line 53, delete "sonic" and insert --some--, therefor In column 10, line 42, before "such", insert --In--, therefor In column 10, line 44, delete "b r" and insert --by--, therefor In column 11, line 32, delete "game," and insert --game.--, therefor In column 11, line 35, delete "game" and insert --game. Idle--, therefor In column 11, line 54, delete "abet" and insert --a bet--, therefor In column 11, line 55, delete "abet" and insert --a bet--, therefor In column 11, line 65, before "on", insert --(e.g.,--, therefor In column 12, line 30, after "player", delete "active", therefor In column 12, line 45, delete "302" and insert --301--, therefor In column 12, line 47, delete "302" and insert --301--, therefor In column 12, line 50, before "based", insert --(e.g.,--, therefor In column 13, line 23, before "a", insert --(e.g.,--, therefor In column 13, line 38, delete "in" and insert --In--, therefor In column 13, line 44, before "poker", insert --1-on-1--, therefor In column 13, line 46, delete "Hold can" and insert --Hold'Em--, therefor In column 14, line 18, delete "white" and insert --while--, therefor CERTIFICATE OF CORRECTION (continued)
U.S. Pat. No. 8,545,330 B2

In column 14, line 48, after "game).", insert --¶--, therefor

In column 15, line 22, before "a", insert --(e.g.,--, therefor

In column 15, line 41, delete "white" and insert --while--, therefor

In column 15, line 47, delete "game," and insert --game.--, therefor

In column 15, line 49, delete "around" and insert --a round--, therefor

In column 15, line 59, before "in", insert --(e.g.,--, therefor

In column 16, line 55, delete "in" and insert --In--, therefor

In column 17, line 1, before "after", insert --(e.g.,--, therefor

In column 17, line 4, delete "306" and insert --304--, therefor

In column 17, line 6, delete "306" and insert --304--, therefor

In column 17, line 8, delete "306" and insert --304--, therefor

In column 17, line 10, delete "306" and insert --304--, therefor

In column 17, line 14, delete "306" and insert --304--, therefor

In column 17, line 18, delete "306" and insert --304--, therefor

In column 17, line 20, after "skipped", delete "¶", therefor

In column 17, line 22, delete "306" and insert --304--, therefor

In column 17, line 33, delete "306" and insert --304--, therefor

In column 17, line 36, delete "306" and insert --304--, therefor

In column 17, line 39, delete "306" and insert --304--, therefor

In column 17, line 43, delete "dealt," and insert --dealt.--, therefor

In column 17, line 44, delete "306" and insert --304--, therefor

In column 17, line 56, delete "abetting" and insert --a betting--, therefor

In column 18, line 12, delete "white" and insert --while--, therefor

In column 18, line 28, delete "player." and insert --player--, therefor

In column 18, line 30, delete "second." and insert --second--, therefor

In column 18, line 43, delete "302" and insert --304--, therefor

CERTIFICATE OF CORRECTION (continued)
U.S. Pat. No. 8,545,330 B2

In column 18, line 43, delete "developer," and insert --developer.--, therefor

In column 18, line 50, delete "interface," and insert --interface.--, therefor

In column 19, line 1, delete "120c" and insert --120a--, therefor

In column 19, line 39, delete "1000" and insert --1100--, therefor

In column 19, line 59, delete "on," and insert --on.--, therefor

In column 20, line 31, delete "it" and insert --1-On-1--, therefor

In column 20, line 43, before "poker", insert --(e.g.,--, therefor

In column 20, line 46, delete "my" and insert --may--, therefor

In column 20, line 51, after "elements.", delete "¶", therefor

In column 21, line 6, before "a", insert --(e.g.,--, therefor

In column 21, line 19, before "poker", insert --(e.g.,--, therefor

In column 21, line 33, before "1,000", insert --(e.g.,--, therefor

In column 22, line 57, delete "1000)." and insert --1100).--, therefor

In column 22, line 60, delete "win!")," and insert --win!")--, therefor

In column 23, line 10, delete "1000." and insert --1100.--, therefor

In column 23, line 10, delete "challenger" and insert --challenge--, therefor

In column 23, line 16, delete "305" and insert --306--, therefor

In column 23, line 29, delete "1000." and insert --1100.--, therefor

In column 23, line 30, after "type", insert --(e.g.,--, therefor

In column 23, line 44, delete "challenger" and insert --challengee--, therefor

In column 23, line 46, after "challenger.", delete "¶", therefor

In column 23, line 51, delete "amount," and insert --amount.--, therefor

In column 23, line 67, delete "challenge" and insert --challenger--, therefor

In column 24, line 10, delete "game," and insert --game.--, therefor

In column 24, line 25, delete "1" and insert --I--, therefor

In column 24, line 28, delete "button," and insert --button.--, therefor

CERTIFICATE OF CORRECTION (continued)
U.S. Pat. No. 8,545,330 B2

In column 24, line 29, delete "(previous" and insert --previous--, therefor

In column 24, line 32, delete "a." and insert --a--, therefor

In column 25, line 9, delete ".Poker" and insert --Poker--, therefor

In column 25, line 44, delete "butt)n)" and insert --button)--, therefor

In column 25, line 57, delete "poker"," and insert --poker")--,--, therefor

In column 26, line 25, delete "1800" and insert --1880--, therefor

In column 26, line 33, delete "interface." and insert --interface--, therefor

In column 26, line 37, delete "dealt," and insert --dealt.--, therefor

In column 26, line 45, after "shown)", insert --)--, therefor

In column 26, line 49, before "by", insert --(e.g.,--, therefor

In column 27, line 1, delete "chips," and insert --chips.--, therefor

In column 27, line 3, delete "cards," and insert --card.--, therefor

In column 27, line 13, delete "20" and insert --20A--, therefor

In column 27, line 14, delete "interface." and insert --interface--, therefor

In column 27, line 14, delete "2000," and insert --2000.--, therefor

In column 27, line 21, delete "200" and insert --2000--, therefor

In column 27, line 27, delete "21" and insert --20B--, therefor

In column 27, line 34, delete "-won" and insert --won--, therefor

In column 27, line 55, before "the", insert --in--, therefor

In column 28, line 4, delete "10A-10C)," and insert --10A-10C).--, therefor

In column 28, line 19, before "a", insert --(e.g.,--, therefor

In column 28, line 21, delete "a." and insert --a--, therefor

In column 28, line 25, after "the", delete "¶", therefor

In column 29, line 8, delete "feed." and insert --feed--, therefor

In column 29, line 47, delete "my" and insert --may--, therefor

In column 29, line 49, delete ". poker" and insert --poker--, therefor

In column 30, line 8, delete "add." and insert --add--, therefor

In column 30, line 17, before "Zynga", insert --(e.g.,--, therefor

In column 30, line 31, delete "(primary" and insert --primary--, therefor

In column 30, line 52, delete "120h," and insert --120b,--, therefor

In column 31, line 4, before "a", insert --(e.g.,--, therefor

In column 31, line 23, before "1", insert --(e.g.,--, therefor

In column 32, line 24, before "addition", insert --In--, therefor

In column 32, line 26, delete "up," and insert --up.--, therefor

In column 32, line 55, before "the", delete "a", therefor

In column 32, line 60, delete "slots," and insert --slots),--, therefor

In column 33, line 5, delete "1201)." and insert --120b.--, therefor

In column 33, line 11, after "respect", insert --to--, therefor

In column 33, line 32, delete "dealt," and insert --dealt.--, therefor

In column 34, line 8, after "to", insert --FIGS.--, therefor

In column 34, line 11, delete "my" and insert --may--, therefor

In column 35, line 1, delete "challenger," and insert --challenger.--, therefor

In column 35, line 9, delete "2600" and insert --312--, therefor

In column 35, line 15, delete "challengee)," and insert --challengee).--, therefor In column 35, line 16, delete "2600" and insert --312--, therefor In column 35, line 18, delete "2600" and insert --312--, therefor In column 35, line 18, delete "award." and insert --award--, therefor In column 35, line 19, delete "2600" and insert --312--, therefor In column 35, line 22, delete "2600" and insert --312--, therefor In column 35, line 25, delete "120b," and insert --120b.--, therefor In column 35, line 25, delete "2600" and insert --312--, therefor In column 35, line 41, delete "client," and insert --client.--, therefor

CERTIFICATE OF CORRECTION (continued)
U.S. Pat. No. 8,545,330 B2

In column 36, line 17, delete "rote" and insert --role--, therefor

In column 36, line 20, delete "2810," and insert --2810.--, therefor

In column 36, line 23, delete "2820b," and insert --2820b.--, therefor

In column 36, line 28, delete "28201)" and insert --2820b--, therefor

In column 36, line 43, delete "in" and insert --In--, therefor

In column 36, line 56, delete "527" and insert --2827--, therefor

In column 37, line 7, after "(HTTP", insert --)--, therefor

In column 37, line 51, delete "own." and insert --own--, therefor

In column 38, line 4, delete "computed" and insert --computer--, therefor

In column 38, line 30, delete "time," and insert --time.--, therefor

In column 38, line 58, delete "520a" and insert --2820a--, therefor

In column 39, line 10, delete "client." and insert --client--, therefor

In column 39, line 18, delete "toads" and insert --loads--, therefor

In column 39, line 52, delete "It" and insert --In--, therefor

In column 39, line 60, delete "in" and insert --In--, therefor

In column 40, line 5, before "such", insert --(--, therefor

In column 40, line 12, delete "represent" and insert --represents--, therefor

In column 40, line 33, delete "2926," and insert --2926.--, therefor

In column 40, line 59, delete "a." and insert --a--, therefor

In column 40, line 65, delete "in" and insert --In--, therefor

In column 41, line 11, delete "in" and insert --in- --, therefor

In column 41, line 11, delete "smart." and insert --smart--, therefor

In column 41, line 15, before "e.g.,", insert --(--, therefor

In column 41, line 28, delete "U" and insert --URL--, therefor

In column 41, line 38, after "XML", insert --,--, therefor

In column 41, line 60, delete "OM" and insert --(ID),--, therefor

CERTIFICATE OF CORRECTION (continued)
U.S. Pat. No. 8,545,330 B2

In column 42, line 2, delete "and." and insert --and--, therefor

In column 42, line 12, delete "in" and insert --In--, therefor

In column 42, line 20, delete "706," and insert --3006,--, therefor

In column 42, line 34, after "(AMD),", insert --Inc.,--, therefor

In column 42, line 44, before "DRAM", insert --(e.g.,--, therefor

In column 43, line 18, delete "servers," and insert --servers.--, therefor

In column 43, line 58, before "cellular", insert --(e.g.,--, therefor

In column 43, line 60, delete "white" and insert --while--, therefor

In the Claims

In column 46, line 19, in Claim 17, after "16", insert --,--, therefor